United States Patent [19]
Kato et al.

[11] Patent Number: 6,065,922
[45] Date of Patent: May 23, 2000

[54] POWDER LOADING DEVICE WITH DUST CONTAINMENT SYSTEM

[75] Inventors: Fumio Kato; Shinsaku Kamimura; Toshiaki Ninagawa, all of Handa, Japan

[73] Assignee: Tsukasa Industry Co., Ltd., Japan

[21] Appl. No.: 09/332,668

[22] Filed: Jun. 14, 1999

[30] Foreign Application Priority Data

Oct. 26, 1998 [JP] Japan .................................. 10-303122

[51] Int. Cl.⁷ .............................. B65B 1/28; B65G 69/18
[52] U.S. Cl. ........................ 414/397; 414/291; 414/328; 141/93; 141/263
[58] Field of Search ............................. 14/140.5, 141.8, 14/143.1, 160, 199, 288, 291, 292, 299, 328, 329, 389, 397, 586; 141/10, 93, 263, 283, 392

[56] References Cited

U.S. PATENT DOCUMENTS

| | | | |
|---|---|---|---|
| 3,707,998 | 1/1973 | Dalrymple | 414/291 X |
| 4,061,221 | 12/1977 | Higashinaka et al. | 414/291 X |
| 4,095,625 | 6/1978 | Marpe | 141/93 |
| 4,714,097 | 12/1987 | Binzen et al. | 414/291 X |
| 4,756,646 | 7/1988 | Spencer | 414/291 X |
| 5,345,982 | 9/1994 | Nadeau et al. | 141/93 |
| 5,348,063 | 9/1994 | Handleman | 141/263 X |
| 5,397,371 | 3/1995 | Hough | 414/291 X |
| 5,415,512 | 5/1995 | Buchfink | 414/291 X |
| 5,890,868 | 4/1999 | Comardo | 414/397 X |

*Primary Examiner*—Dean J. Kramer
*Assistant Examiner*—Gerald J. O'Connor
*Attorney, Agent, or Firm*—Morrison Law Firm

[57] ABSTRACT

A cover of a powder loading device prevents the escape of loose powder when the powder is transferred from a storage container of a plant to a receiving container. A blower inside the cover moves air from the outside, under the cover, a filter, and returns the filtered air to the outside. A backwash device is operated periodically to remove the filtered powder from the filter into the receiving container. The powder is delivered storage container to the receiving container through a retractable loading chute. A powder detection switch within the retractable loading chute determines when the receiving container is full and stops the transfer of powder. The result is a powder loading device which maximizes dust collection and minimizes lost loose powder. The powder loading device adapts to various plant and receiving container sizes.

17 Claims, 26 Drawing Sheets

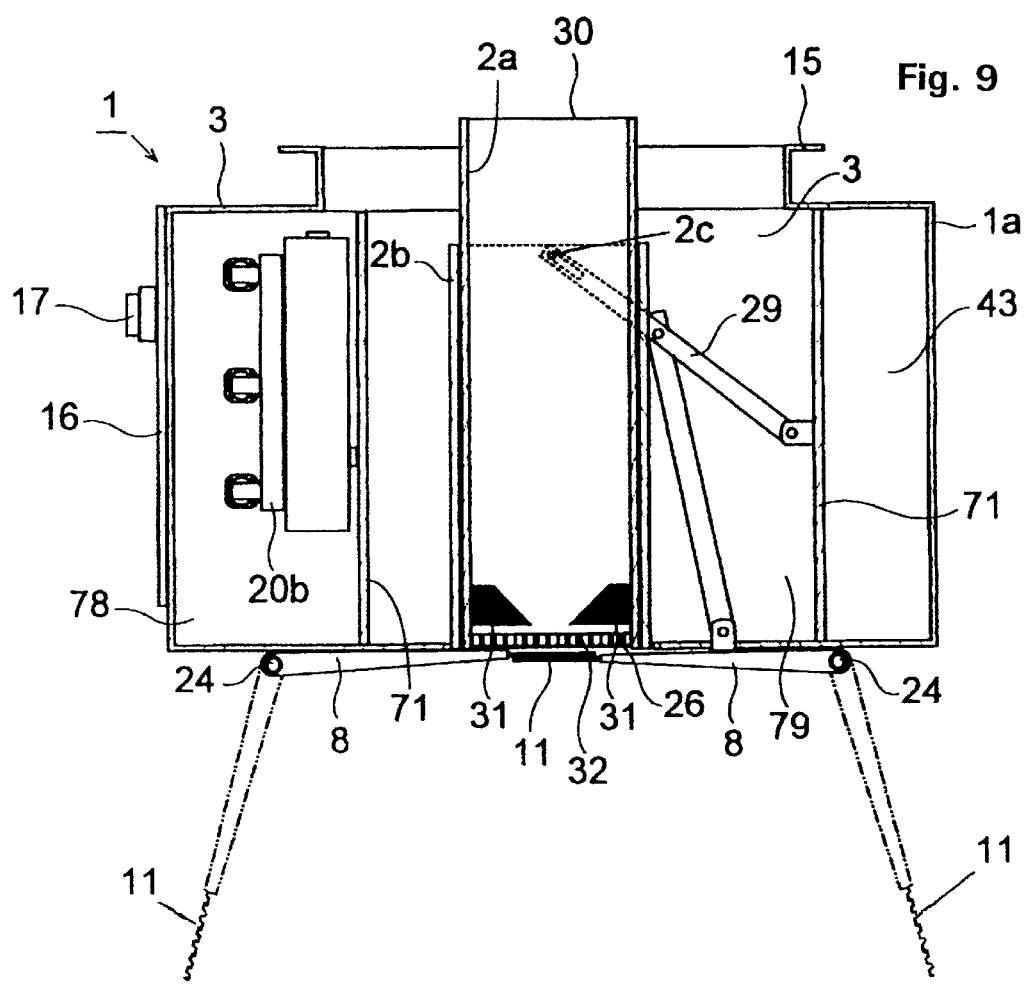

Fig. 14
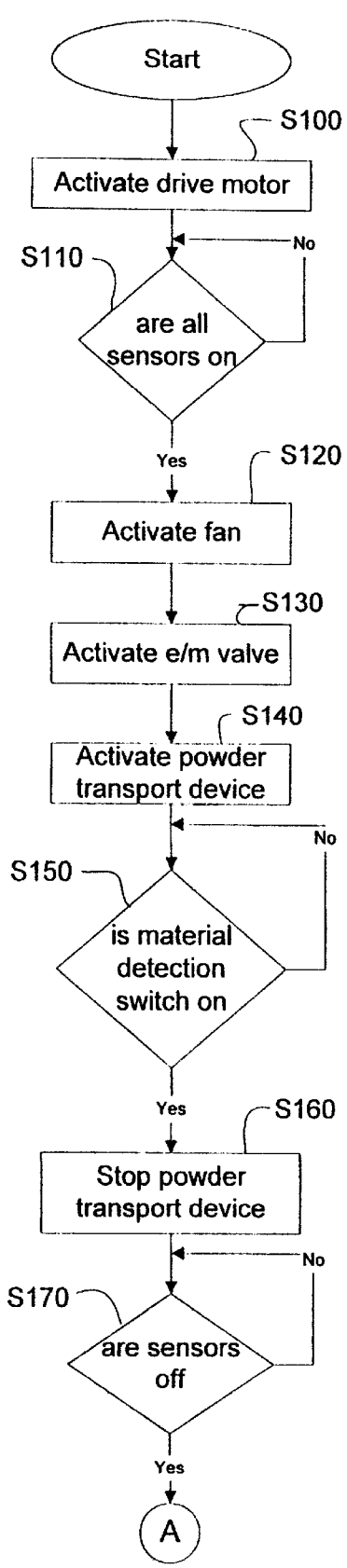
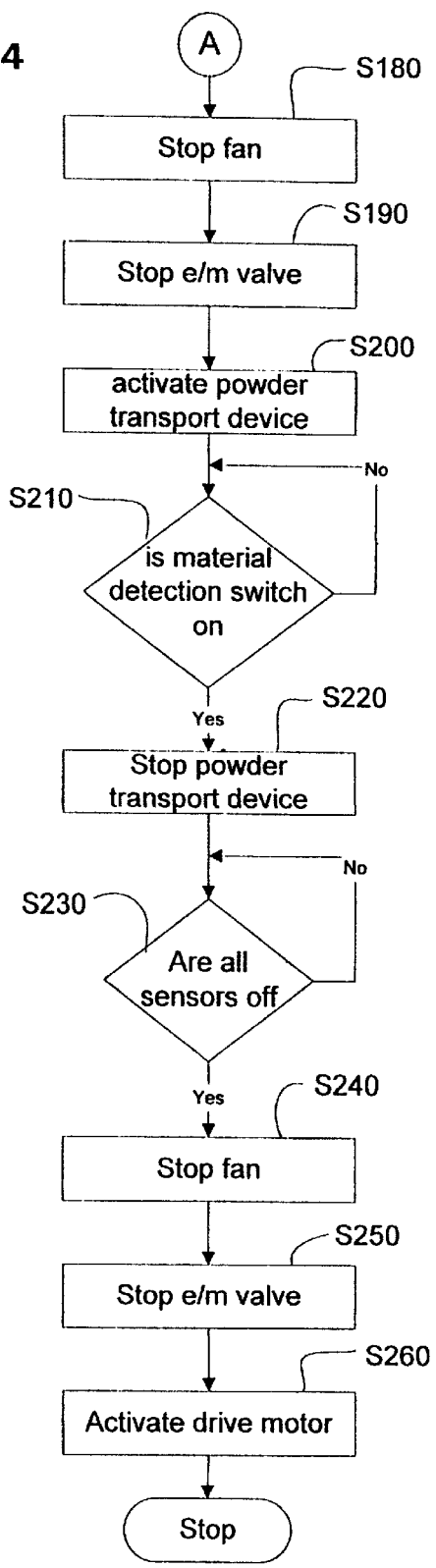

POWDER LOADING DEVICE WITH DUST CONTAINMENT SYSTEM

BACKGROUND OF THE INVENTION

The present invention relates to a powder loading device for transferring powdered material such as powdered food, powdered feed, powdered chemicals, or powdered pharmaceuticals from a powder silo or the like, used for temporary storage, into a boat, a freight car, a truck, or the like.

Many different types of powder, including raw material for food products and industrial applications, are widely used. Large-scale plants use large amounts of powder. Since shipping powder is labor-intensive, various types of powder, which serve as raw materials, are transferred from a truck via air conveyance to a raw powder storage silo for temporary storage. The raw powder materials stored in the silo are sifted and then stored in a product powder storage silo as the powder to be used as the product.

The shipping means, such as a ship, a train, or a truck, departs from a shipping section. The raw powder material or the powder product is stored in an overhead silo. A powder loading device, also known as a loader, is installed in the ceiling of the shipping section to load the raw powder material or the powder product into the shipping means. The following is an overview of a conventional powder loading device used to load powder into trucks.

Referring to FIG. 1, powder, such as raw wheat or bran, is stored in a silo (not shown) at a product or feed plant 500. In general, powder is shipped in a loose state by dropping the powder through an opening at the top of a trailer or a dump truck 502 using a truck loader 501. The powder falls freely from its own weight into the opening of dump truck 502. Truck loader 501 is installed in the ceiling of the first floor of plant 500. A conveyer 503, installed on the third floor of plant 500, moves the powder from the silo to truck loader 501 via a pipeline 504. Truck loader 501 is attached to the ceiling of a truck transport opening 505.

Referring to FIG. 2, eaves 506 project significantly outward from a section of the first floor of plant 500 to provide rain protection over a shipping section 507. An accordion-style extendable chute 509, attached via a loader mounting section 508, is extendable downward. A canvas feed 510, attached on the lower end of extendable chute 509, contains a raw material detection level switch 511.

A motor powering section 512, which controls the extension and contraction of extendable chute 509, is located on a lower surface of loader mounting section 508. A chute connecting pipe 513 connects extendable chute 509 to powder pipeline 504. Powder pipeline 504 extends inside plant 500. A control panel 518 is installed in plant 500 to control the loading of powder.

Dump truck 502 arrives at shipping section 507 of plant 500. A worker operates control panel 518 to move extendable chute 509 downward until canvas feed 510 contacts the bottom of a container 514 on dump truck 502. The worker operates control panel 518 to send powder from pipeline 504 into extendable chute 509 via chute connection pipe 513. Powder flows through extendable chute 509 into container 514 of dump truck 502.

As the powder is loaded into container 514 of dump truck 502, the powder level rises. Powder accumulates inside canvas hood 510, activating raw material detection level switch 511. Motor 512 begins to retract extendable chute 509. The powder left in canvas hood 510 is gravity fed from the lower section of canvas hood 510 into dump truck 502. When canvas hood 510 is empty, raw material detection level switch 511 is deactivated, stopping the retraction of extendable chute 509. The cycle is repeated to load powder into container 514 of dump truck 502.

Truck loader 501 drops powder into dump truck 502 from above to allow loose shipping of the powder. This loading method is especially prone to powder flying out from container 514 of dump truck 502. In order to prevent this flying out of powder, a dust collector 515 (FIG. 1) is attached to the uppermost floor of plant 500. A suction pipe 516, at the suction end of a dust collector 515, terminates inside extendable chute 509, as shown in FIG. 2. A circulation pipe 517 returns dust collected from the outlet end of dust collector 515 back to pipeline 504.

Implementation and installation of the arrangement described above is requires a plant that is large enough to contain the pipes, which must be laid in a particular orientation, and the dust collector, which must be positioned at a relatively high elevation. Even if space is available to install the dust collector and pipes, a large amount of dead space is consumed. If suction from dust collector 515 creates a negative pressure inside extendable chute 509, preparing loose shipment of powder with the door of container 514 left open will result in dust being collected only near the exit opening of extendable chute 509. This complicates collection of particles flying up from inside container 514. Thus, significant amounts of powder can escape from the open section of container 514. Truck loading section 507 of plant 500 is generally open to the outside, with only eaves 506 projecting over truck loading section 507. As a result, when preparing loose shipment of powder, the powder is directly affected by surrounding air currents thereby permitting excessive amounts of powder to escape into the environment. This results in a bad work environment.

OBJECTS AND SUMMARY OF THE INVENTION

A first object of the present invention is to provide a clean work environment which avoids powder escaping while loading powder into a vehicle.

A second object of the present invention is to provide efficient dust collection that limits pressure variations during dust collection.

A third object of the present invention is to prevent pressure loss and contamination inside ducts.

A fifth object of the present invention is to limit noise from the dust collector.

A sixth object is to allow simple assembly and quick installation of a powder loading system.

A seventh object is to allow design changes to be easily implemented to accommodate the various container sizes on the dump truck, semi-trailer or the like used for loose powder shipment.

Briefly stated, the present invention provides a cover of a powder loading device which prevents the escape of loose powder when the powder is transferred from a storage container of a plant to a receiving container. A blower inside the cover moves air from the outside, under the cover, a filter, and returns the filtered air to the outside. A backwash device is operated periodically to remove the filtered powder from the filter into the receiving container. The powder is delivered storage container to the receiving container through a retractable loading chute. A powder detection switch within the retractable loading chute determines when the receiving container is full and stops the transfer of powder. The result is a powder loading device which maximizes dust collection and minimizes lost loose powder. The powder loading device adapts to various plant and receiving container sizes.

According to an embodiment of the invention, there is provided a powder loading device for loading powder into a container comprising a housing, the housing being positioned to fit above the container, at least one loading chute passing generally vertically through the housing for carrying the powder from a source to the container, at least one blower in the housing, the blower moving air on an air path from below the housing to a location outside the housing, at least one filter in the air path, and the filter being effective for filtering particles of the powder in the air path.

According to another embodiment of the invention, there is provided a powder loading device for loading powder into a container comprising a housing, the housing being positioned to fit above the container, a loading chute passing generally vertically through the housing for carrying said powder from a source to the container, at least one blower in the housing, the blower moving air on an air path from below the housing to a location outside the housing, a filter in the air path, the filter being effective for filtering particles of the powder in the air path, flap gates disposed on a lower surface of the housing, means for opening and closing the flap gates at least one dust protection hood located on at least one longitudinal end of the powder loading device, and the dust protection hood providing a substantially enclosed dust protection chamber between the powder loading device the said container.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 9 is a cross-section side-view drawing along the B—B line in the single loader of FIG. 3.

FIG. 14 is a flowchart of the operations performed by the control unit of the single loader of FIG. 3 to provide automated loading of loose powder.

DETAILED DESCRIPTION OF THE INVENTION

Figure 1:
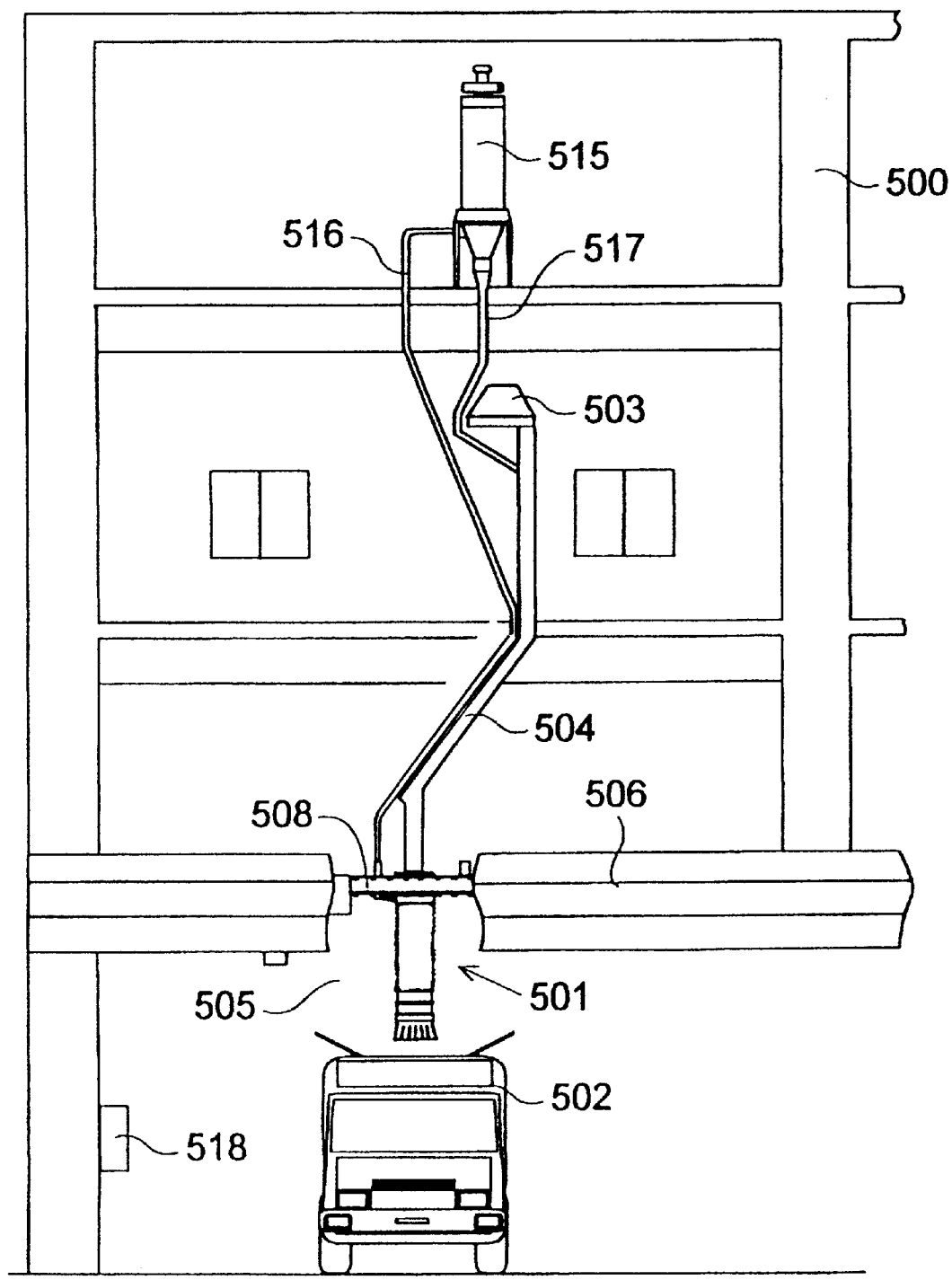
FIG. 1 is a partially cut-away cross-section drawing describing a powder loading device of the prior art.
Figure 2:
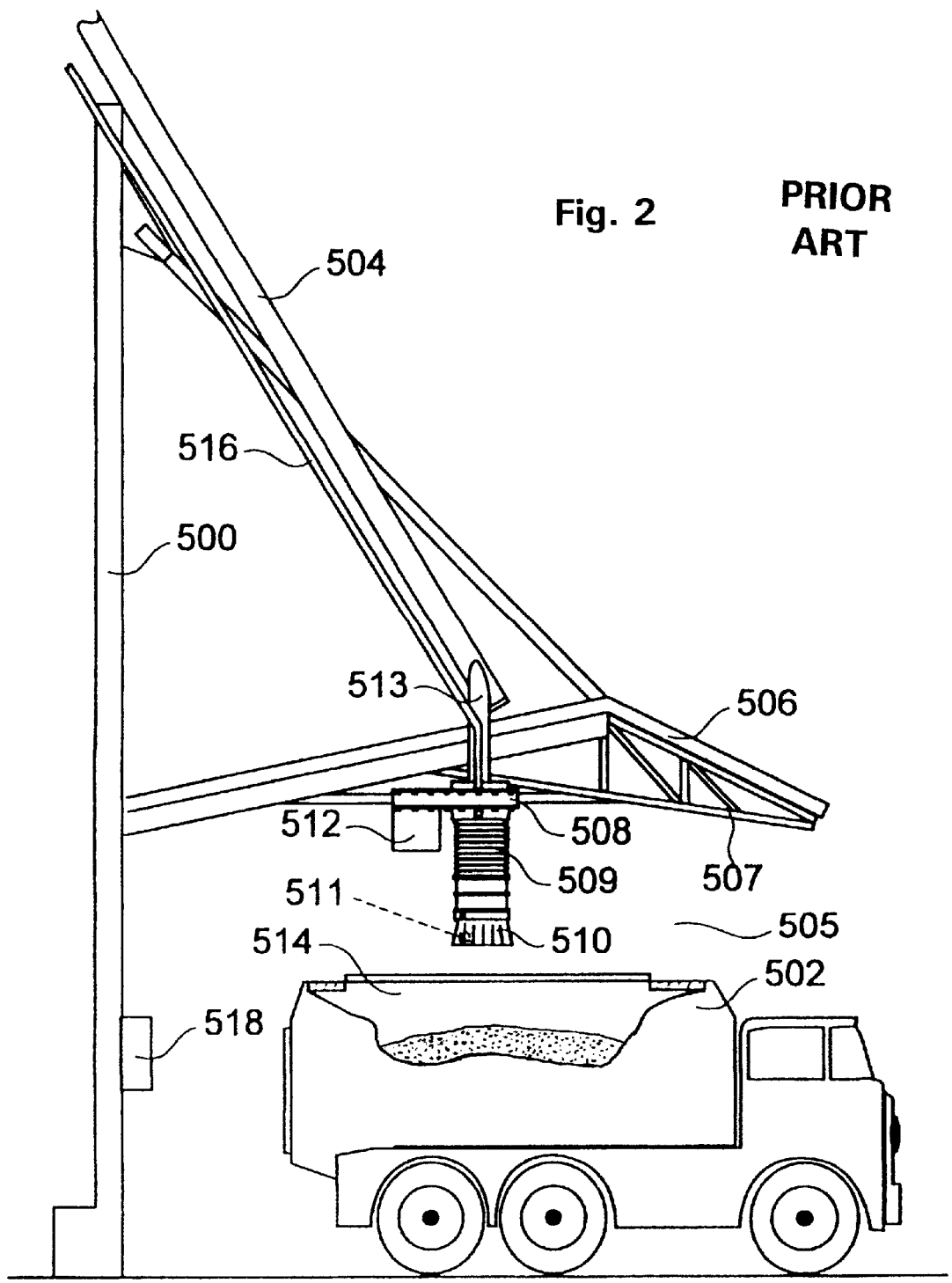
FIG. 2 is a side-view drawing for the purpose of describing a powder loading device of the prior art.
Figure 3:
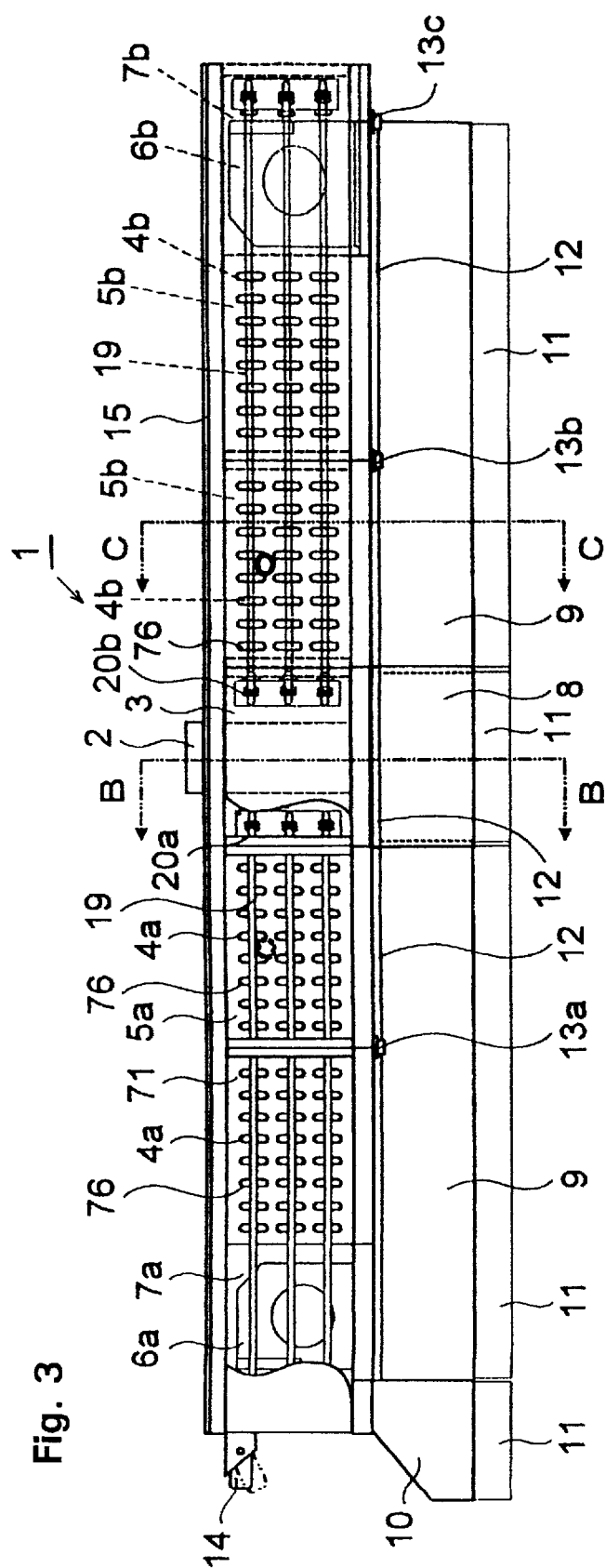
FIG. 3 is a partially cut-away front-view drawing showing the internal structure and the exterior of a single loader for dump trucks according to the present invention.
Figure 4:
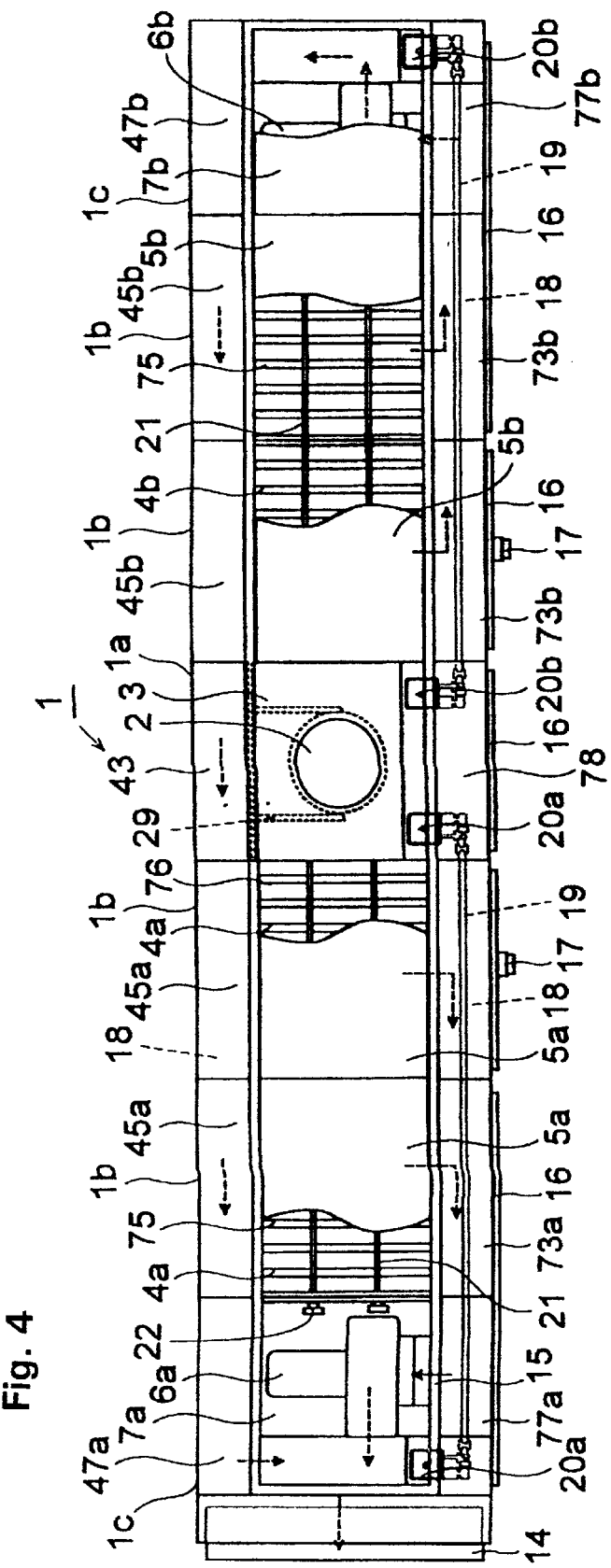
FIG. 4 is a partially cut-away plan drawing showing the internal structure and the exterior of the single loader of FIG. 3.

Referring to FIGS. 3 and 4, a single loader 1 includes a loading block 3, dust collection blocks 5a and 5b and fan blocks 7a and 7b, integrally assembled to form a long, box-shaped dust collection unit. Loading block 3, dust collection blocks 5a and 5b, and fan blocks 7a and 7b are each contained in housings 1a, 1b and 1c formed of plates arranged in a box shape. Housings 1a, 1b and 1c are formed from light metals, such as aluminum plates, to permit installation of large sized loaders without reinforcement. Welding is avoided as much as possible. Internal bends (not shown in the figures) formed on each block are joined with bolts and nuts to assemble the blocks into a single unit, allowing the formation of single loader 1 with almost no external projections such as flanges. The lack of external projections improves the cosmetic appearance of the unit and provides for easier transportation of the unit. Installing the unit in a plant or the like involves simply connecting cables and a high-pressure air blower, significantly reducing installation time.

Referring now to FIG. 3 through FIG. 10, loading block 3 includes a vertically extendable and retractable loading chute 2. Two dust collection blocks 5a, each including dust collection filters 4a, are connected laterally to the left side of loading block 3. Fan block 7a, containing motor fan 6a for suctioning dust, is disposed at the left of dust collection blocks 5a. Similarly, two dust collection blocks 5b, each including dust collection filters 4b, are connected laterally to the right side of loading block 3. Fan block 7b, containing motor fan 6b for suctioning dust, is disposed at the right of dust collection blocks 5b. Suction motor fans 6a and 6b contain fans or blowers to suction air through single loader 1.

Filters 4a and 4b, having similar structures, of dust collection blocks 5a and 5b, are large filters disposed laterally in housing 1b. A partitioning plate 71 projects inside housing 1b to form a centrally disposed dust collection space 72 having a relatively large volume. Cylindrical intake paths 73a and 73b, having relatively small volumes, are disposed to the left of filters 4a and 4b. Cylindrical outlet paths 45a and 45b are disposed to the right of filters 4a and 4b. A plurality of oval-shaped openings (not shown in the figures) are formed along a prescribed direction at a section of partitioning plate 71. A filter cloth 75, having an envelope shape, includes long, metal retainers 76. The open ends of retainers 76 are fixed to the oval-shaped openings. When dust is being collected, filter cloth 75 shrinks while particles are adsorbed. During subsequent back-washing, filter cloth 75 expands to its original roughly elliptical shape. The spaces between adjacent filter cloths 75 are chosen to permit shaking off particles of dust by impact. Retainers 76 have cross sections that are roughly flattened circles, such as, for example, ovals or ellipses.

Figure 7:
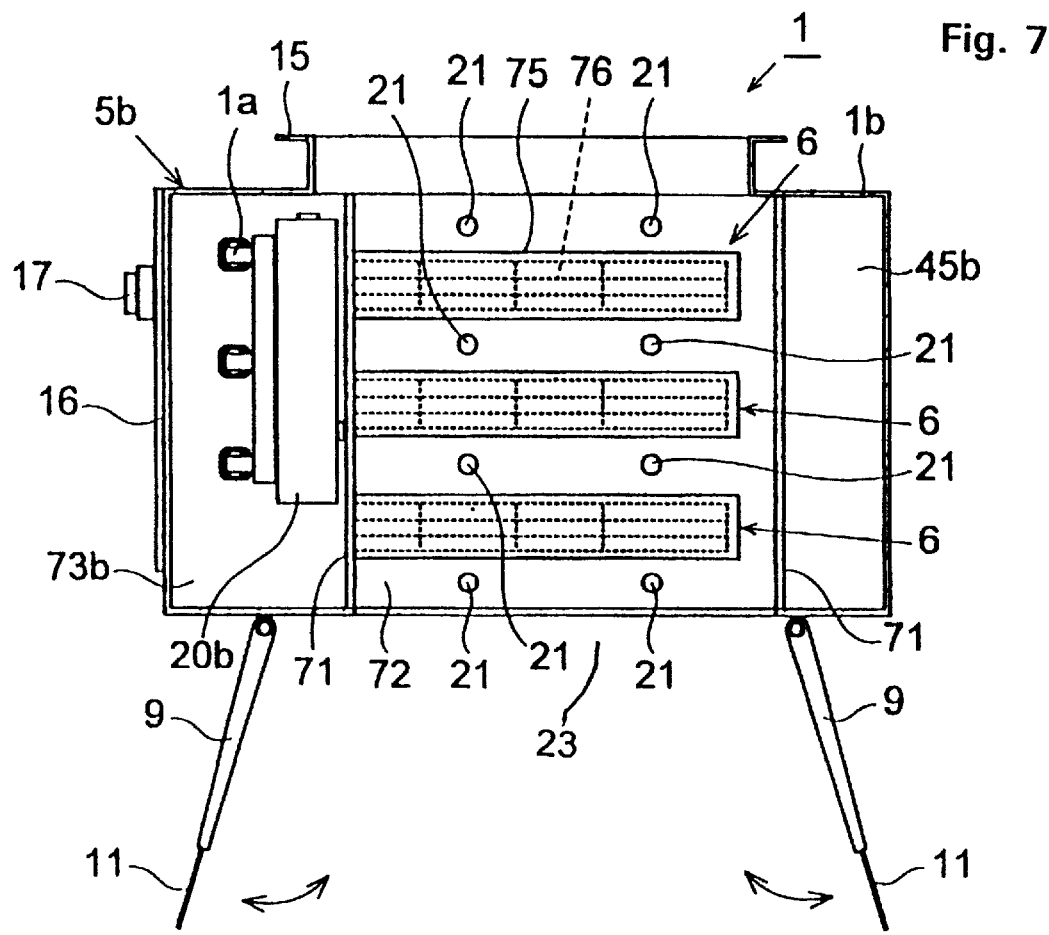
FIG. 7 is a cross-section side-view drawing along the C—C line of the single loader of FIG. 3.

Referring to FIG. 7, filter cloth 75 and retainer 76 project laterally in dust-collection space 72. The structures and arrangements of the elements in the filter devices 4a and 4b can be modified as appropriate.

Referring now to FIGS. 3 and 4, intake paths 77a and 77b, formed in front of fan blocks 7a and 7b respectively, connect to intake paths 73a and 73b respectively. Suction fan motor 6a takes in air filtered by filter device 4a via intake paths 73a and 77a. Similarly, suction fan motor 6b takes in air filtered by the filter device 4b via the intake paths 73b and 77b. A plurality of air jet nozzle pipes 19, providing for the backwash of filter cloths 75, extend laterally across intake paths 73a and 77a and intake paths 73b and 77b. Electromagnetic air valves 20a and 20b, on the side surfaces of loading block 3, feed high-pressure air to a backwash air jet nozzle pipes 19. During back-washing, the air is injected into retainers 76, thereby expanding filter cloth 75 into its oval-shaped cross-section. This allows the particles adsorbed on filter cloth 75 to be shaken off by impact of pulses of air.

Internal cleaning nozzles 21, disposed in pairs along a plurality of levels extend across dust collection space 72 inside dust collection blocks 5a and 5b. Internal cleaning nozzle 21 is a pipe on which a plurality of slits (not shown) are disposed along its axis. A rotating section 22 is attached to the end of cleaning nozzle 21. High-pressure air is injected into cleaning nozzle 21, blowing air from the slits while cleaning nozzle 21 is rotated. For example, Japanese patent number 2634042, herein incorporated in its entirety by reference, describes dust collections filters similar to those used in the present invention.

Referring to FIG. 4, an outlet path 43 is formed toward the back of loading block 3. Outlet paths 45a and 45b are formed toward the back of dust collection blocks 5a and 5b respectively. Outlet paths 47a and 47b are formed toward the back of the fan blocks 7a and 7b respectively. All outlet paths 43, 45a, 54b, 47a, and 47b are contiguous, whereby dust and air flows through them in sequence. An air duct 18 serves as an outside exhaust for air from suction motor fan 6b. Suction motor fan 6b suctions the air through dust collection block 5b, disposed to the right of loading block 3. Suction motor fan 6a suctions the air through dust collection block 5a, disposed to the left of loading block 3. The suctioned air passes through suction motor fans 6a and 6b into exhaust paths 43, 45a, 45b, 47a, and 47b. The air streams join tog,ether inside the left end of single loader 1 and is released through an air curtain nozzle 14. Air curtain nozzle 14 acts against natural air flow from the front, preventing dust from flying up. Air curtain nozzle 14, attached to the left end of single loader 1, is tilted to allow for adjustment of the direction in which the exhaust air blows. In the figures, air curtain nozzle 14 is installed only at the front end of single loader 1, but it would also be possible for the nozzle to be installed on a side surface to handle lateral air flows.

Referring to FIGS. 9, 10(a) and 10(b), a circular opening 26 is formed on the bottom surface of loading block 3. A pair of free-flap gates 8 open and close circular opening 26. In FIG. 9, the dotted lines indicate the opened state, whereas the solid lines indicate the closed state of the free-flap gates 8.

Referring to FIGS. 3 and 7, an opening 23 is formed on the bottom surfaces of dust collection blocks 5a and 5b. A pair of driven flap gates 9 open and close the lower surface of opening 23 and the bottom surface of fan block 7a and 7b.

Figure 17:
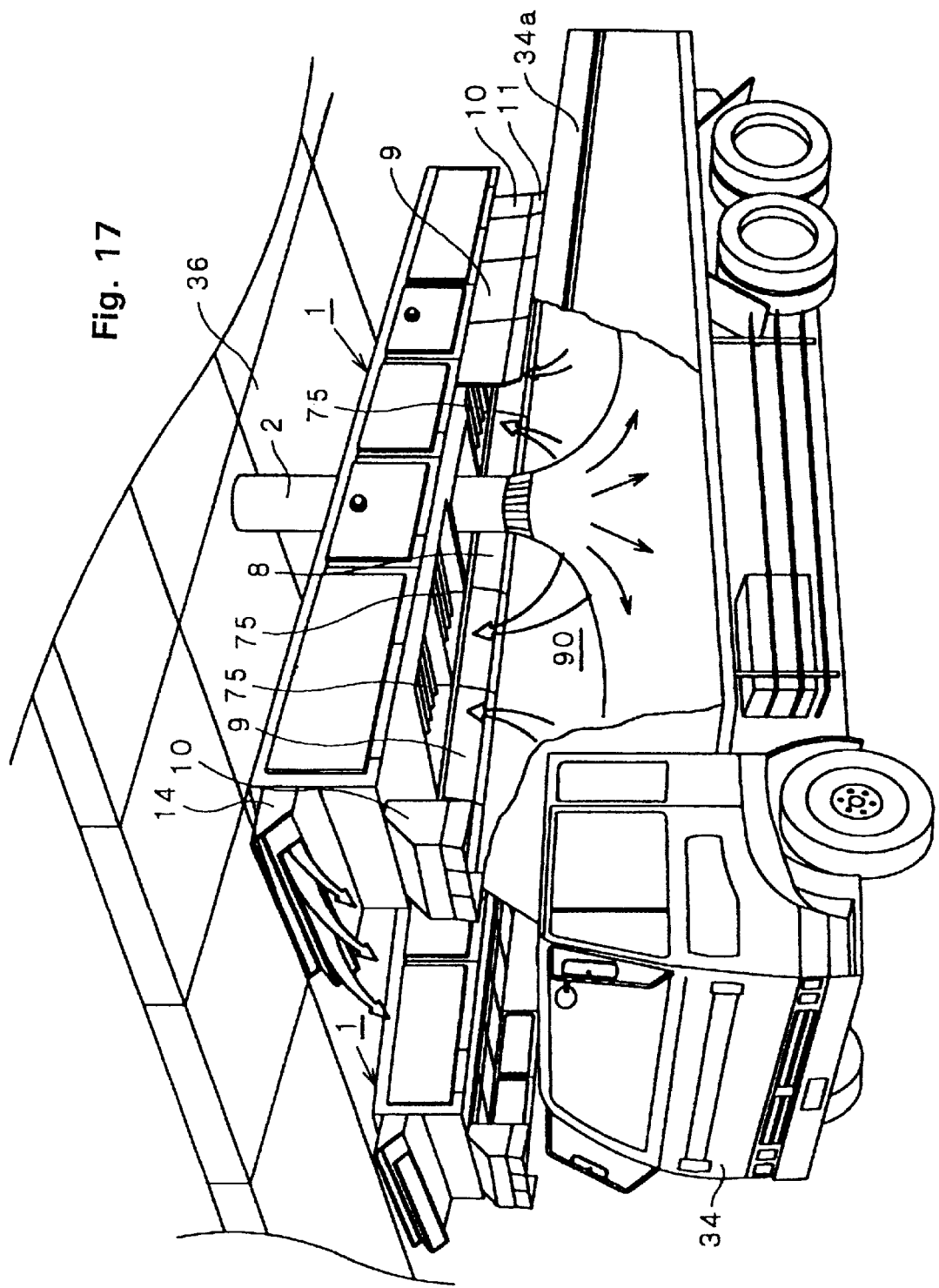
FIG. 17 is a drawing for the purpose of describing the loading operations performed by the single loader of FIG. 3.
Figure 18:
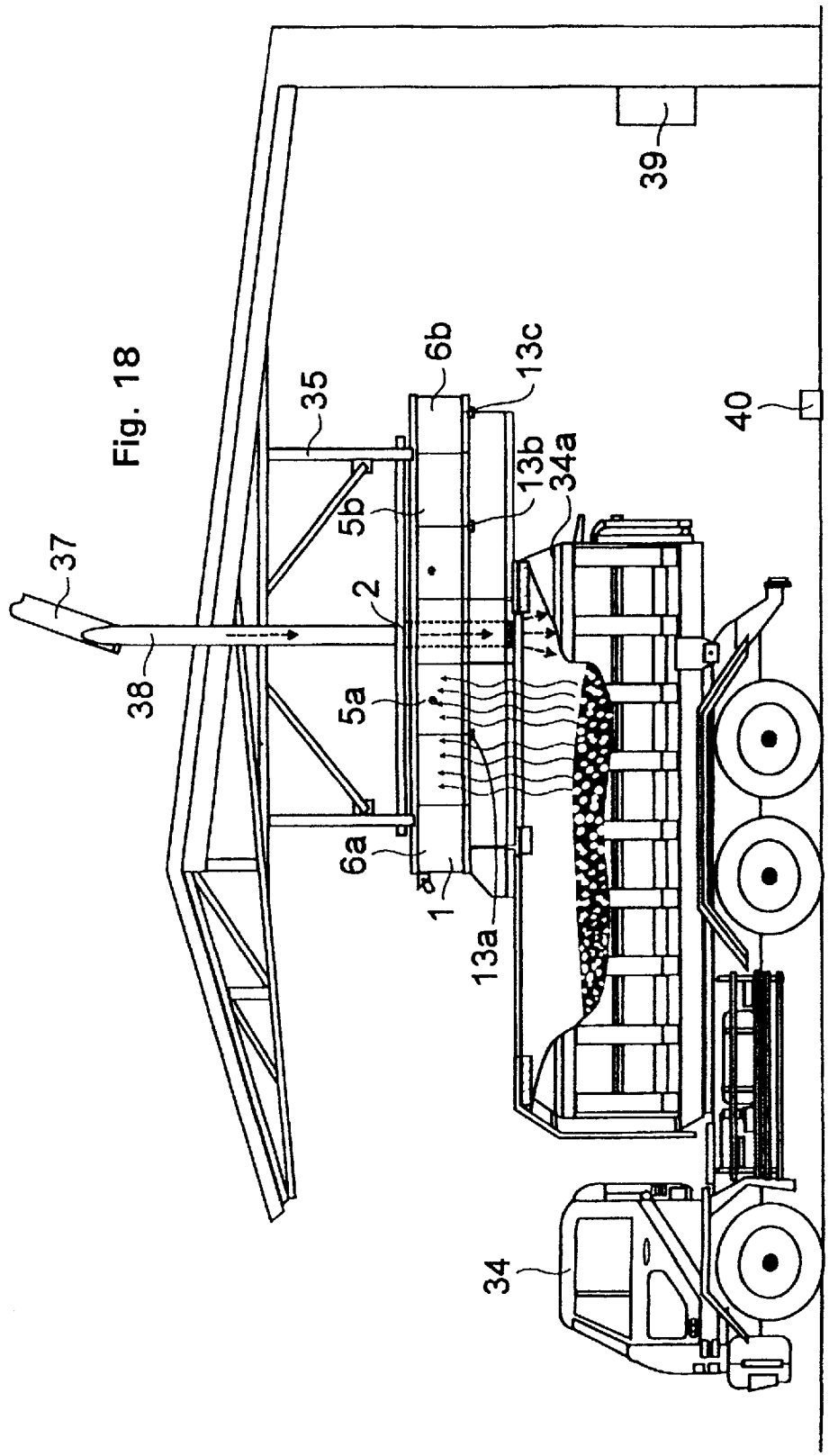
FIG. 18 is a drawing for the purpose of describing later steps in the loading operations performed by the single loader of FIG. 3.
Figure 19:
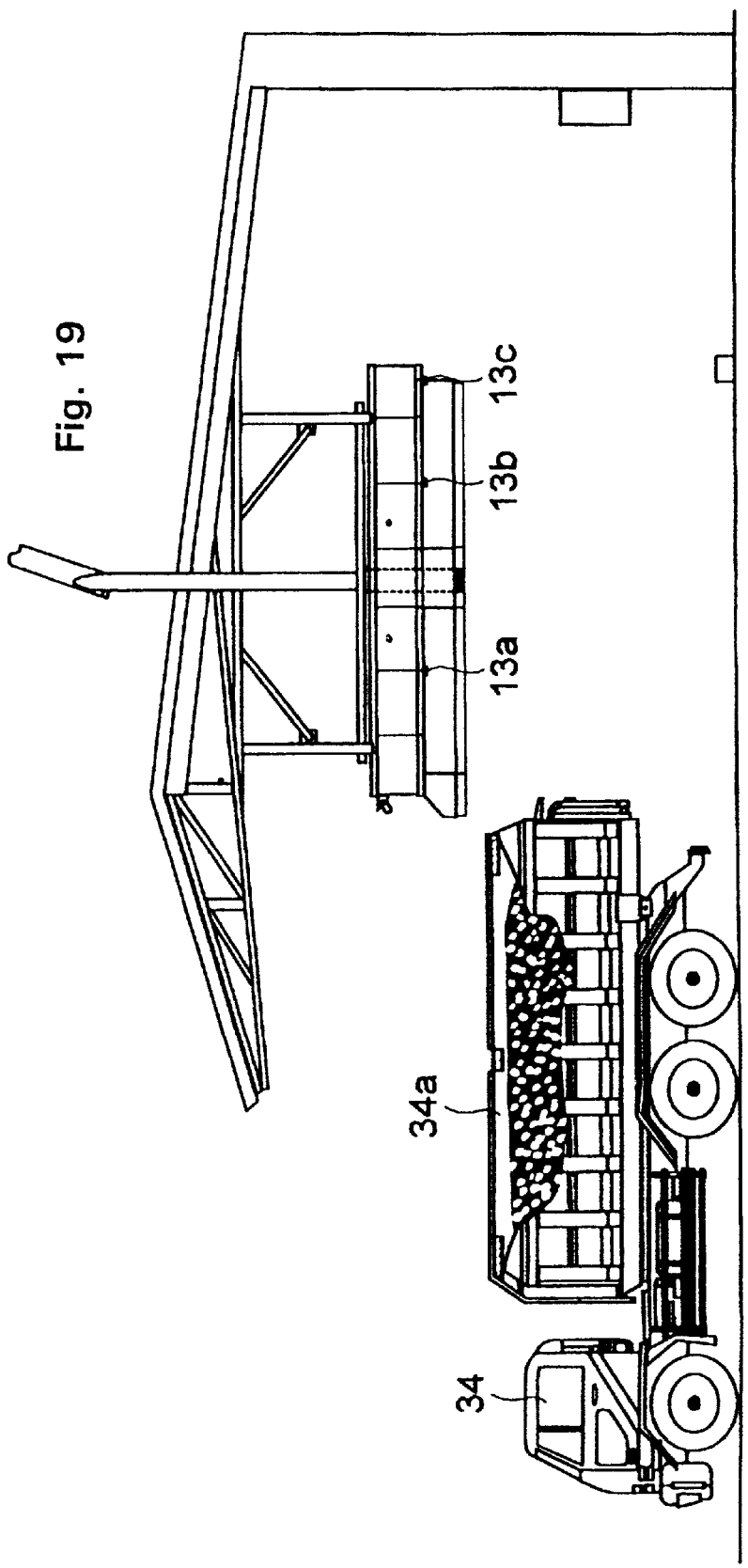
FIG. 19 is a drawing for the purpose of describing the completion of the loading operation performed by the single loader of FIG. 3.

Referring now to FIG. 17, dust protection hoods 10 are disposed at the bottom ends of the front and rear of suction motor fan block 6a. Short dust-protection vinyl sheets 11 are attached to the lower edges of both free-flap gates 8 and driven flap gates 9. The width of single loader 1 preferably has about the same width as dump truck 34. The length of single loader 1 is roughly the same as the length of container 34a of dump truck 34.

Figure 5:
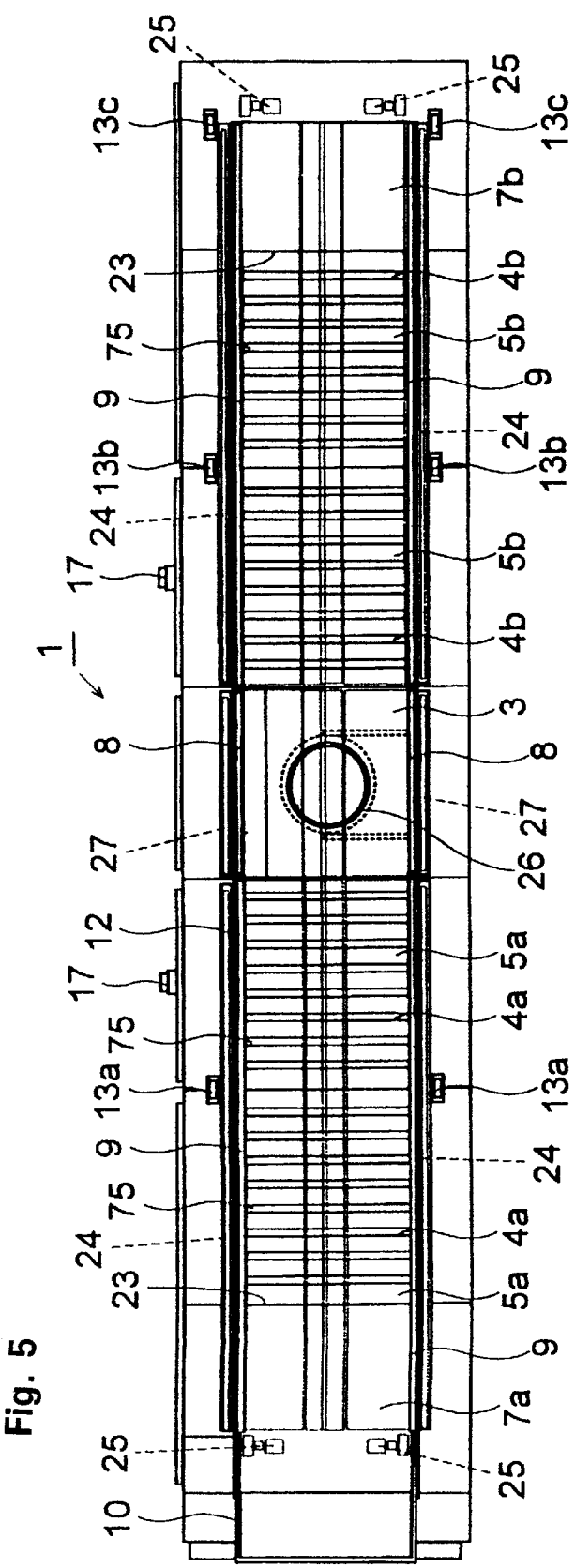
FIG. 5 is a bottom-view drawing showing the internal structure and the exterior of the single loader of FIG. 3.

Referring now to FIG. 5, three pairs of truck sensors 13a, 13b, and 13c, disposed on the bottom surface of single loader 1 toward the outside of shaft cover 12, detect the position of dump truck 34. A cover includes housings 1a, 1b, and 1c, free-flap gates 8, driven flap gates 9, dust protection hoods 10, and dust protection vinyl sheets 11. Depending on the circumstances, rear dust protection hood 10 or both front and rear dust protection hoods 10 are eliminated or not used. Dust protection hoods 10 are generally formed as plates that cover the spaces to the front and rear of single loader 1. Generally, dust protection hoods 10 are fixed, rather than opening and closing like flap gates 8 and 9. If dump truck 34 is longer than loader 1, and cannot be covered by flap gates 8 and 9, dust protection hoods 10 permit closing the entire opening over dump truck 34, providing efficient dust collection.

Truck sensors 13a, 13b and 13c may be of any convenient type such as, acoustic, radar and optical. Due to the dusty environment, optical sensors are probably not preferred. For some types of powder, magnetic or other types of sensors may also be used.

Shaft covers 12, containing shafts 24 which connect with flap gates 8 and 9, are disposed on the bottom surfaces of blocks 3, 5a, 5b, 7a, and 7b. In other words, when single loader 1 is viewed from above, openings 23 are below the dust collection blocks 5a and 5b, as shown in FIG. 5. When the flap gates 8 and 9 open out to either side filter cloth 75 is exposed. Two sets of driven flap gates 9 are rotatably attached via shafts 24 to the inside of the open ends of openings 23 of dust collection blocks 5a and 5b. Driven flap gates 9 open and close in tandem. Drive motors 25, attached inside fan blocks 7a and 7b of single loader 1, connect to shafts 24. Drive motors 25 open and close the driven flap gates 9.

Figure 6:
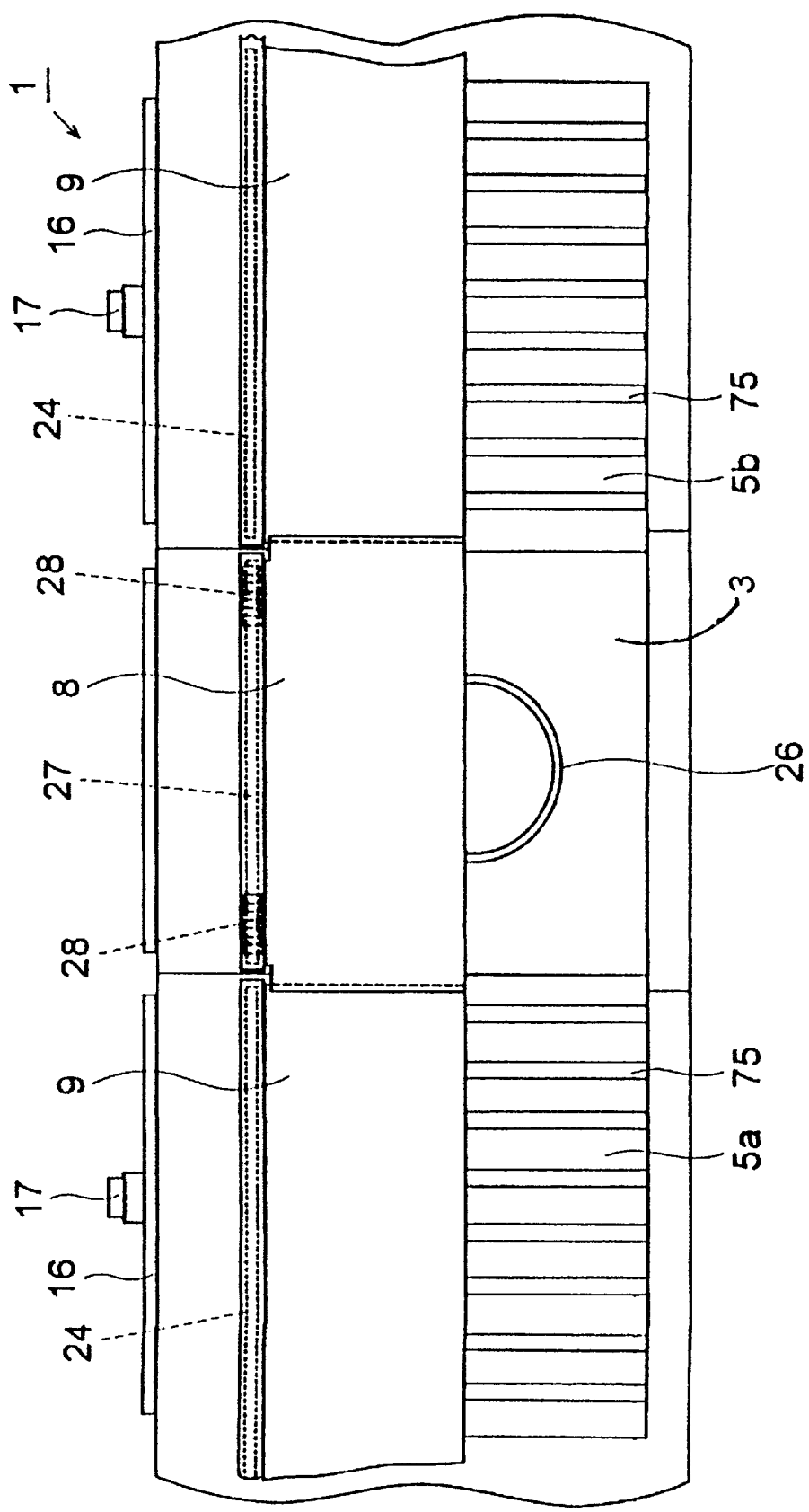
FIG. 6 is a partially enlarged drawing of the single loader of FIG. 3.

Referring to FIG. 6, loading block 3 includes a circular opening 26 on its bottom surface which leads to retractable loading chute 2 (not shown in FIG. 6). A single set of free flap gates 8 is rotatably disposed on either side of opening 26 via a shaft 27. Free flap gates 8, which have no drive source, are kept closed by return springs 28. The adjacent ends between free flap gates 8 and driven flap gates 9 are formed with offsets, allowing the ends of free flap gates 8 to overlap the outer ends of driven flap gates 9. This overlap provides for the opening and closing of free flap gates 8. As driven flap gates 9 open and close, free flap gates 8 open and close. Manual opening and closing of free flap gates 8 is possible when driven flap gates 9 are closed.

Figure 8:
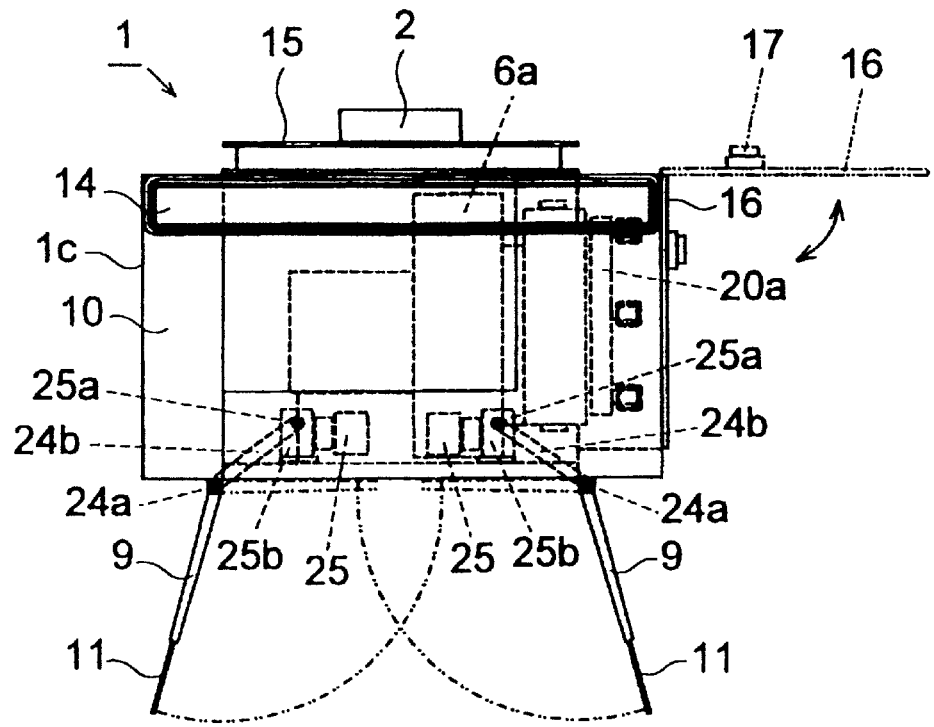
FIG. 8(a) is a left side-view drawing showing the internal structure and the exterior of the single loader of FIG. 3.
FIG. 8(b) is a right side-view drawing showing the internal structure and the exterior of the single loader of FIG. 3.
Figure 8B:
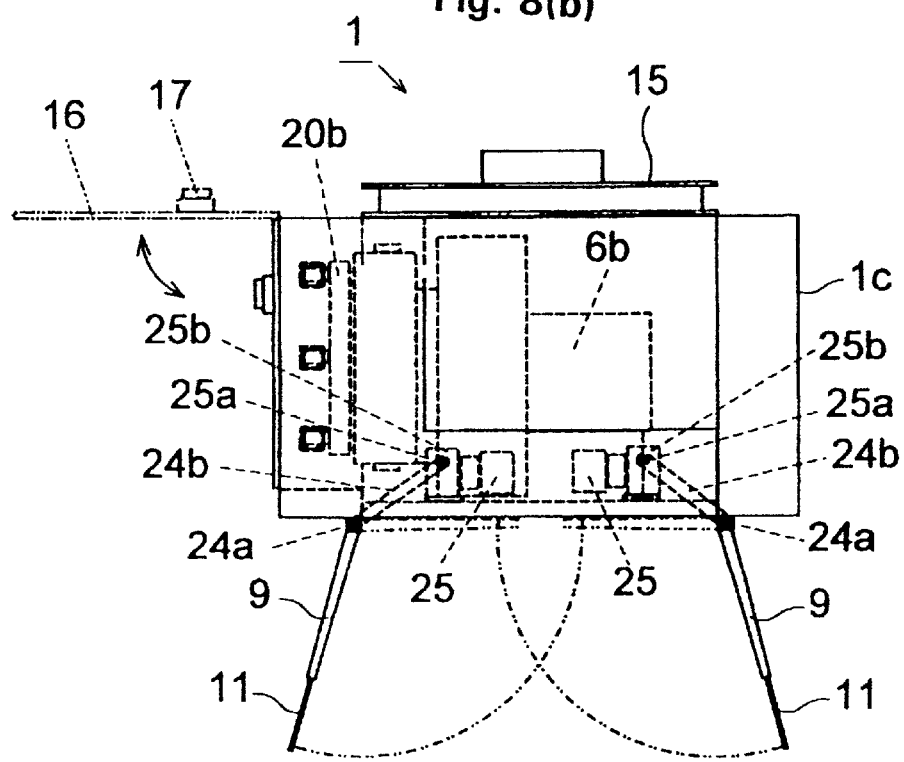
Figure 10:
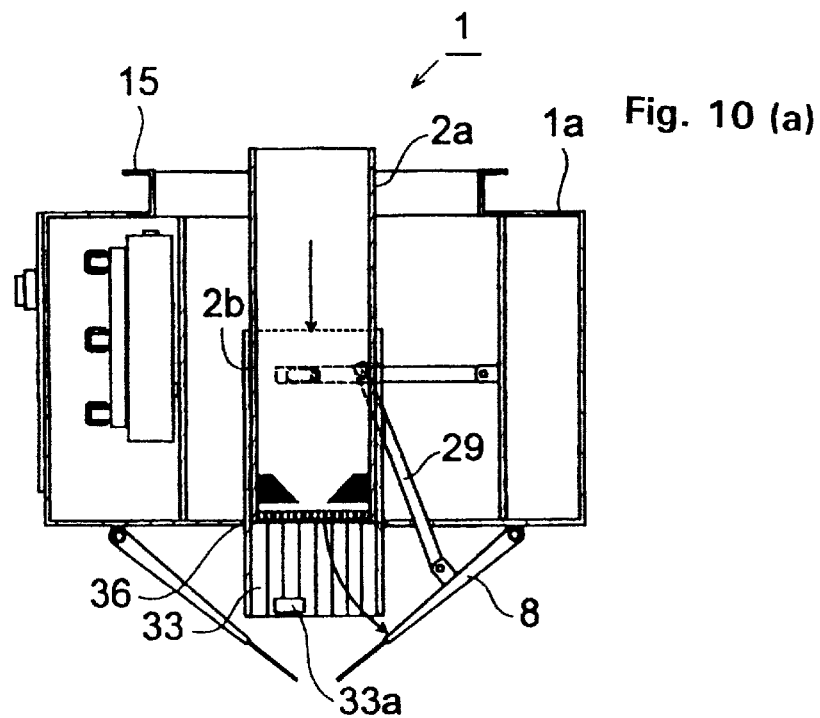
FIG. 10(a) describes the retractable loading chute of the single loader of FIG. 3.
FIG. 10(b) further describes the retractable loading chute of the single loader of FIG. 3.
Figure 10:
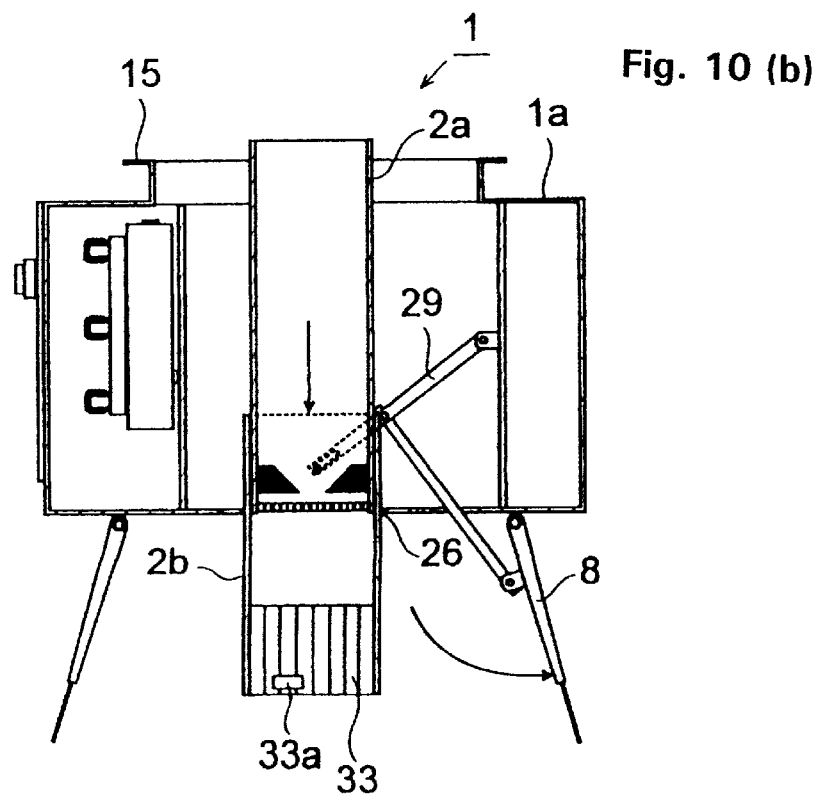

Referring now to FIGS. 8(a) and 8(b), left driven flap gate 9 is connected to a gear box 25a via a chain 24b. A sprocket 24a fits to the end of shaft 24 attached to the bottom surface of single loader 1. Left and right drive motors 25 drive their respective gear boxes 25a. The drive shaft of a sprocket 25b, driving chain 24b, is eccentrically attached to right gear box 25a provides a slight delay in the activation of right driven flap gate 9 when driven flap gates 9 are to be closed. Thus, when left and right driven flap gates 9 close, left and right dust protection vinyl sheets 11 at the ends of driven flap gates 9 overlap with right driven flap 9 overlapping left driven flap 9. The movement of driven flap gates 9 and dust protection vinyl sheets 11 is indicated by dotted lines in FIGS. 8(a) and 8(b).

Referring to FIG. 4, angles 15 are attached to the upper portions of the housings 1a, 1b, and 1c. Inspection doors 16 are provided on side surfaces of dust collection blocks 5a and 5b. Differential pressure gauges 17, fixed to inspection doors 16, detect differences between the atmospheric pressure and the pressure inside dust collection space 72.

Referring to FIGS. 4 and 9, partitioning plates 71 partition loading block 3 into a holding chamber 78 on the left side, a loading chamber 79 at the center, and an outlet path 43 on the right side. Holding chamber 78 contains electromagnetic air valves 20a and 20b. An inner cylinder 2a extends through the upper surface and lower surface of housing 1a. An outer cylinder 2b fits on the outer perimeter surface of inner cylinder 2a to provide a telescoping structure in loading block 3. A link mechanism 29 is formed in a T shape. One end of link mechanism 29 attaches to the outer perimeter surface of outer cylinder 2b using a pin 2c. The other ends of linking mechanism 29 attach with pins to the back surface of free flap gates 8 and the inner wall of loading block 3.

A funnel-shaped cushion 31, disposed on a lower portion of the inside of inner cylinder 2a slows the speed at which the powder material passes through a powder entry opening 30. A grating 32, below funnel-shaped cushion 31, eliminates foreign matter from the powder.

Referring to FIG. 10(a), outer cylinder 2b is connected to free flap gates 8 by link mechanism 29. The opening of free flap gate 8, as indicated by the curved arrow, causes outer cylinder 2b to be pulled by link mechanism 29. Outer cylinder 2b slides in the direction of the straight arrow, projecting downward from circular opening 26 at the bottom surface of single loader 1. In this state, a canvas hood 33, at the bottom end of outer cylinder 2b, is exposed.

Figure 16:
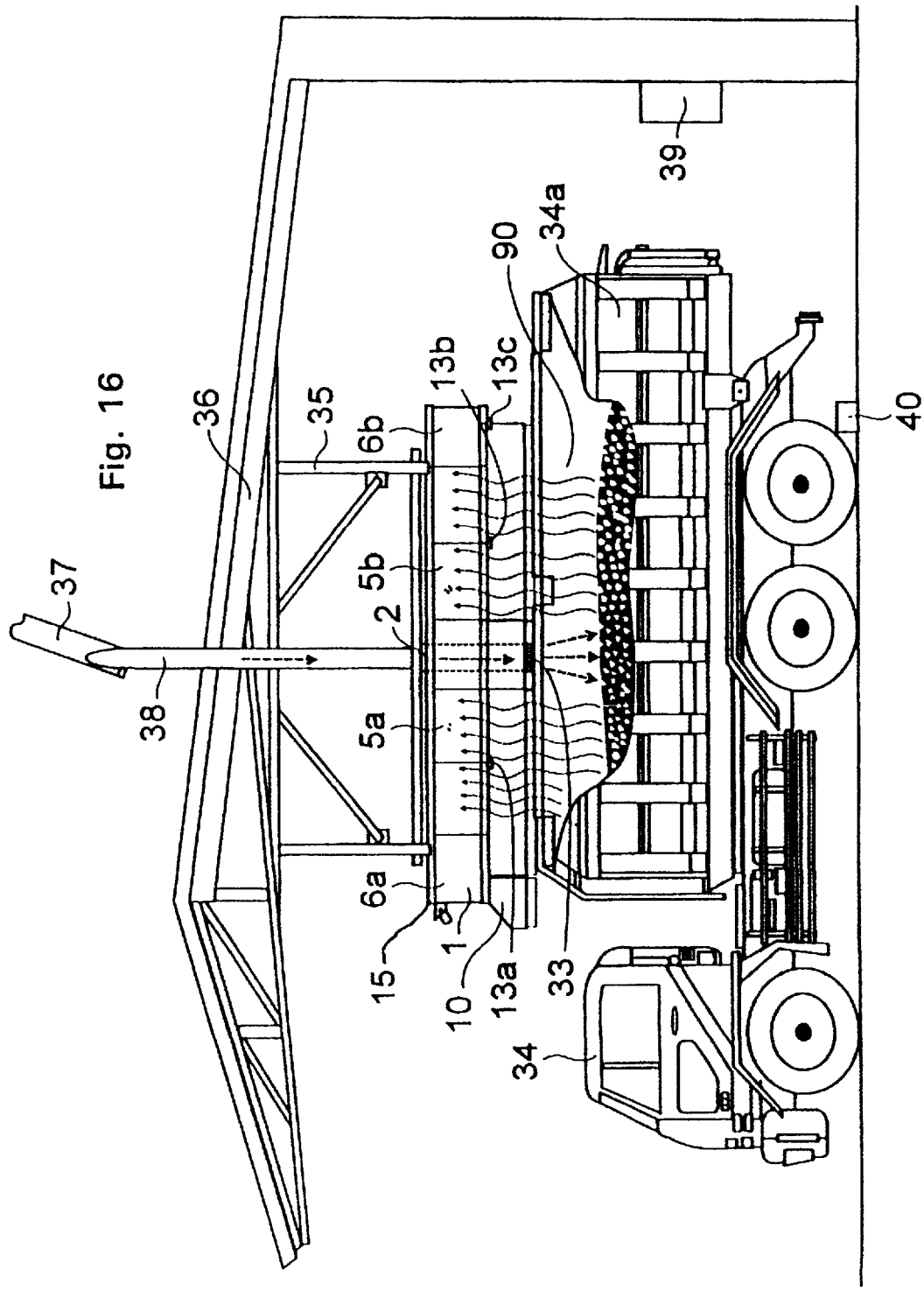
FIG. 16 is a drawing for the purpose of describing the loading operations performed by the single loader of FIG. 3.

Referring to FIGS. 10(b) and 16, when free flap gates 8 are pulled fully open in the direction indicated by the curved arrow, link mechanism 29 is drawn downward to project outer cylinder 2b further in the direction of the straight arrow until link mechanism 29 is stopped at its lowermost position. A material detection level switch 33a, attached inside canvas hood 33, prevents loaded powder from leaking from a container 34a of dump truck 34. When the powder level reaches the position of material detection level switch 33a, the powder level is detected and a signal is sent to a control panel 39 to stop the powder loading operation.

An example of dump truck single loader 1 of this embodiment installed in a loose loading section 36 of powder/feed plant is described as follows. Single loader 1 is assembled by joining blocks 3, 5a, 5b, 7a, and 7b. The assembly is performed either on-site or the unit can be pre-assembled at the production plant.

Figure 11:
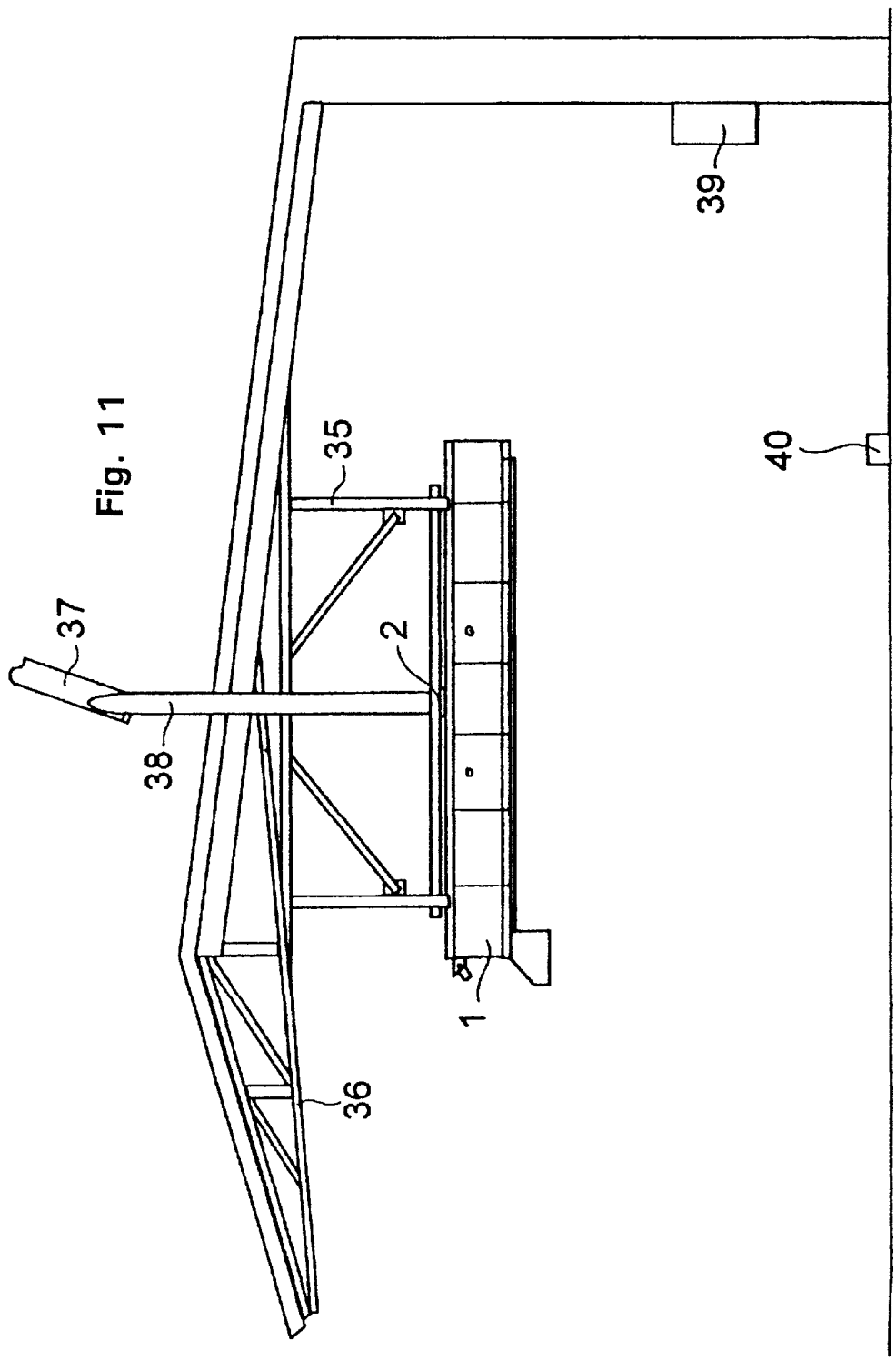
FIG. 11 is an installation diagram showing the single loader of FIG. 3 installed in a loose loading section in a powder/feed plant.
Figure 15:
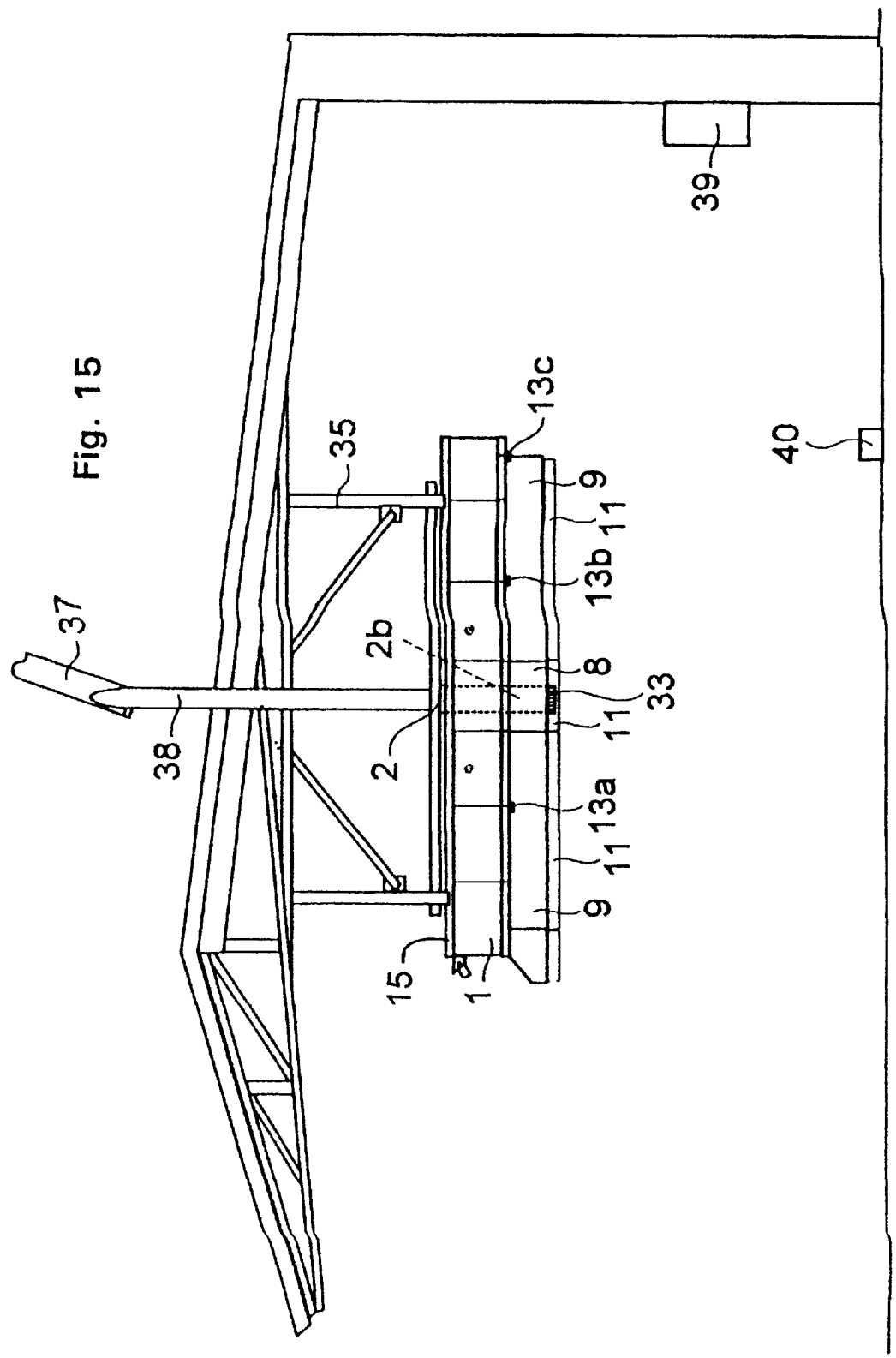
FIG. 15 is a drawing for the purpose of describing the operations performed when the flap gates of the single loader of FIG. 3 are opened.

Referring to FIGS. 11, 15 and 16, an angle 35 is attached to the ceiling of loading section 36 to suspend the bottom of loader 1 just above the height of container 34a of dump truck 34. Attachment angle 15 of single loader 1 is attached to angle 35. A supply pipeline 37 is connected to the upper portion of retractable loading chute 2 via a connecting pipe 38. High-pressure air and a power supply are connected, and control panel 39 is attached to a wall of the plant. A truck stopper 40 is fixed to the ground.

Figure 12:
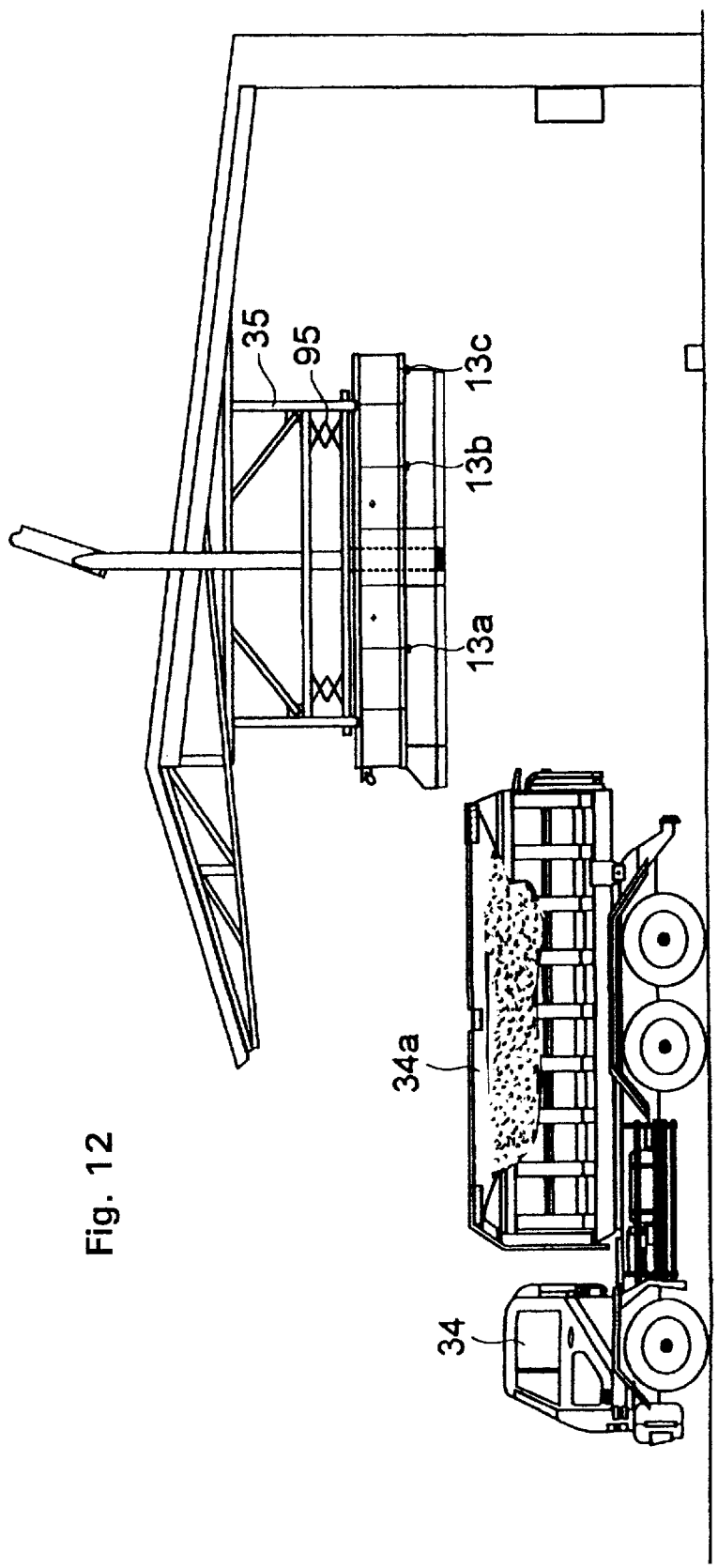
FIG. 12 is an installation diagram showing an alternate embodiment where a retracting mechanism is attached to the single loader of FIG. 3 and the loader is installed in the loose loading section of a powder/feed plant.

Referring to FIG. 12, it is also possible to interpose a retractable mechanism 95 between angle 35 and single loader 1, as in a dumb-waiter. This allows adjustment of the height of single loader 1 according to the type of vehicle involved.

Figure 13:
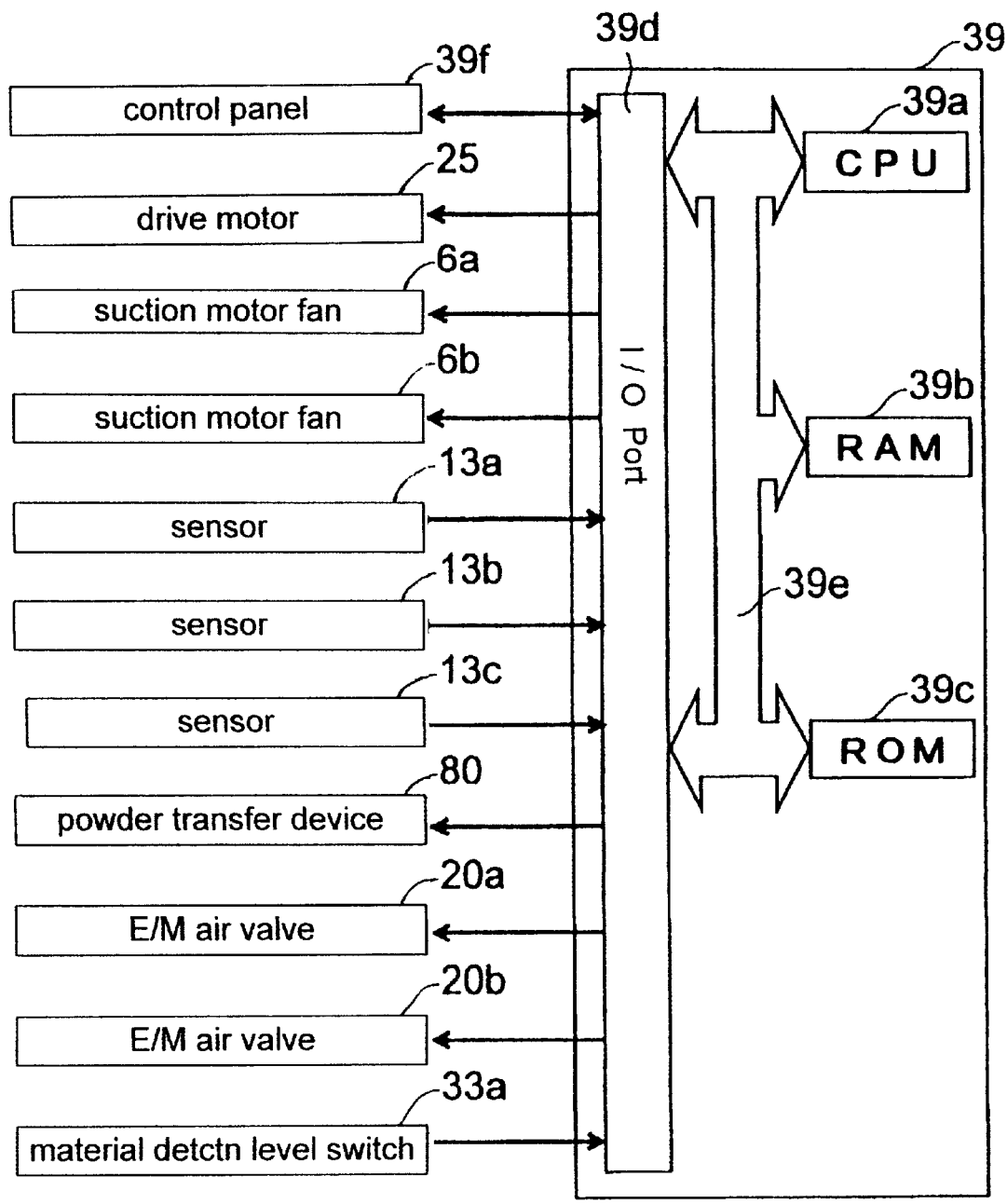
FIG. 13 is a system block diagram of the control unit of the single loader of FIG. 3.

Referring to FIG. 13, control panel 39 includes therein a microcomputer containing a CPU 39a, a RAM 39b a ROM 39c, an I/O port 39d. A bus line 39e connects each of these elements. I/O port 39d includes connections to a control panel 39f, drive motor 25, suction motor fans 6a and 6b, sensors 13a, 13b, and 13c, a powder transporting device 80, electromagnetic air valves 20a and 20b, and material detection level switch 33a. The controls and displays on control panel 39f of control unit 39 are the following conventional items (not shown): a power supply light, a loading ready ON switch, a light indicating loading completion, a loading stop switch, a center arch contact warning display light, a light activated by a motor thermal relay, a warning buzzer, a switch for moving the retractable chute vertically, an emergency shutdown switch, a reset switch, and the like (not shown in the drawings).

When single loader 1 is installed in loose loading section 36 of the powder/feed plant, power is turned on for control panel 39f of the control unit 39, putting the single loader 1 in a standby state. Automated loose loading of powder is performed according to a program stored beforehand in ROM 39c.

Referring to FIG. 13 and FIG. 14, CPU 39a begins the automated loose loading of powder. Control goes to step 100. Drive motor 25, which serves to open and close driven flap gates 9, receives a start signal from control unit 39, causing free flap gates 8 and driven flap gates 9 to open with a slight offset in timing between the left and right flaps. The flaps are completely opened in 3–5 seconds.

Referring to FIGS. 13 through FIG. 19, outer cylinder 2b of retractable loading chute 2 is lowered to expose canvas hood 33. The opening at the upper surface of container 34a of dump truck 34 is closed off by free flap gates 8, driven flap gates 9, dust protection hood 10, and dust protection vinyl sheet 11. In other words, the lower portion of single loader 1 and container 34a form a dust collection chamber 90 over container 34a.

When control proceeds to step 110, CPU 39a repeatedly checks truck sensors 13a, 13b, and 13c until all sensors are ON indicating the presence of dump truck 34. Dump truck 34 enters loading section 36 and stops at truck stopper 40. In this state, all truck sensors 13a, 13b, and 13c detect the entry of dump truck 34 and a signal is sent to control unit 39. As a result, step 110 determines that all sensors are ON and control proceeds to step 120. If any of truck sensors 13a, 13b, and 13c are in the OFF position, the operation is repeated.

When control proceeds to step 120, CPU 39a sends a drive signal to suction motor fan 6a and suction motor fan 6b. Negative pressure is applied to filter 4a of dust collection block 5a and negative pressure is applied to filter 4b of dust collection block 5b, allowing dust collection to begin.

When dust collection blocks 5a and 5b start the dust collection operation, control proceeds to step 130. CPU 39a sends a drive signal to electromagnetic air valves 20a and 20b. Electromagnetic air valves 20a and 20b take the high-pressure air fed from outside and convert it to pulse-jet air. These air pulses are sent through backwash air jet nozzle pipe 19, providing intermittent backwash operation for filters 4a and 4b during dust collection.

Control then proceeds to step 140, and an activation signal is sent to powder air transport device 80 installed in the plant. The activation signal causes the powder from supply pipeline 37 to be sent into retractable loading chute 2 via connecting pipe 38. The powder fed into retractable loading chute 2 is dropped through canvas hood 33 into the front opening of container 34a of dump truck 34. A negative pressure is applied inside dust collection chamber 90 to effectively collect powder escaping from container 34a with filters 4a and 4b. The filtered air is then discharged through air curtain nozzle 14 via suction motor fans 6a and 6b.

Once loading of the powder has started, control proceeds to step 150. CPU 39a reads the signal from material detection level switch 33a in canvas hood 33 and determines whether material detection level switch 33a is ON or OFF. If material detection level switch 33a is OFF, the operation is repeated. When the amount of powder dropped into container 34a of dump truck 34 increases and material detection level switch 33a is determined to be ON, control proceeds to step 160. If material detection level switch 33a switch is determined to be ON, it is assumed that the loading of the powder through the front entry opening of container 34a has been completed, and CPU 39a sends a stop signal to powder air transport device 80 in order to halt the feeding of the powder.

When step 160 is complete, CPU 39a moves to step 170 and waits for truck sensor 13b and truck sensor 13c to switch to OFF. When this happens, CPU 39a assumes that dump truck 34 has moved away from truck sensor 13b and truck sensor 13c. In other words, it is assumed that dump truck 34 has moved forward so that the loading position of loading chute 2 has moved to the rear loading opening of container 34a.

When control proceeds to step 180, CPU 39a sends a stop signal to suction motor fan 6b, which performs dust collection by applying a negative pressure to filter 4b. Control then proceeds to step 190, where CPU 39a sends a stop signal to electromagnetic air valve 20b to stop the backwash operation on filter 4b. Dust collection operations stops at dust collection block 5b, which is now away from container 34a of dump truck 34.

When control proceeds to step 200, CPU 39a sends a drive signal to powder air transport device 80 to load the powder from the rear loading opening on container 34a. Powder is fed from supply pipeline 37 into retractable loading chute 2 via connecting pipe 38. The powder fed into retractable loading chute 2 is loaded into container 34a through the rear loading opening of dump truck 34. See FIG. 18. The powder flying up at container 34a is collected only at dust collection block 5a. When the loading of the powder resumes, dump truck 34 is moved forward and back to lower the powder level in container 34a, making the powder level even.

When the loading of the powder resumes, control proceeds to step 210. CPU 39a reads the signal from material detection level switch 33a attached inside canvas hood 33 to determine if material level switch 33a is ON or OFF. If the switch is OFF, the operation is repeated. When material level switch 33a is ON, control proceeds to step 220, and CPU 39a sends a stop signal to powder air transport device 80 to stop the feeding of powder.

When the loading of powder to dump truck 34 is finished, CPU 39a proceeds to step 230 and repeatedly checks truck sensors 13a, 13b and 13c until all sensors are OFF. Dump truck 34 moves out from loading section 36, causing truck sensors 13a, 13b and 13c to all output OFF. See FIG. 19.

When control proceeds to step 240, CPU 39a sends a stop signal to suction motor fan 6a to halt the dust collection performed by dust collection block 5a. Control then proceeds to step 250, and a stop signal is sent to electromagnetic air valve 20a, blocking the high-pressure air fed from the outside and stopping the backwash operation of dust collection block 5a. Control then proceeds to step 260, and drive motor 25, which opens and closes driven flap gate 9, receives a close signal, causing free flap gates 8 and driven flap gates 9 to close with an offset in timing between the left and right flaps. The flaps completely close in 3–5 seconds. Link mechanism 29 raises outer cylinder 2b of retractable loading chute 2, recessing retractable loading chute 2 into loading block 3. Suction motor fans 6a and 6b stop when flap gates 8 and 9 are open about 30 degrees. This completes the automated loose loading of powder.

An independent startup switch allows rotating section 22 to start and stop as desired. Internal cleaning air jet nozzle pipe 21 rotates while blowing out air to clean out the insides of dust collection blocks 5a and 5b.

With the structure described above, the embodiment of the present invention provides the advantages described below.

(1) Since the main elements of loading block 3, dust collection blocks 5a and 5b, and fan blocks 7a and 7b form a unit that serves as a single system, easy transportation is possible. Also, installation can be performed in a modular manner by simply attaching the different blocks, providing a significant reduction in installation time. Furthermore, the maintenance and cleaning required after the unit is in operation is made easier.

(2) Dust collection blocks 5a and 5b are moved close to the dust sources such as container 34a of truck 34. Also, the entire opening of container 34a can be covered by filters 4a and 4b, evening out the pressure loss and allowing efficient dust collection. Furthermore, the powder shaken from filters 4a and 4b during the backwash operation freely falls into container 34a of truck 34. Thus, there is no dispersion of the powder, and loose loading can be performed efficiently. The flying of powder onto the ground during operation is substantially eliminated.

(3) When single loader 1 is not operating, flap gates 8 and 9 cover the opening at the lower surface of single loader 1. Thus, loss of powder is eliminated, thereby maintaining a neat appearance for loading section 36.

(4) The need for a suction duct is eliminated since dust collection blocks 5a and 5b are moved close to the dust source at container 34a of truck 34. This prevents pressure from being lost at a suction duct and allows the use of a low-power suction motor that is economical and generates little noise.

(5) The housing of the blocks are assembled from aluminum panels, thereby providing lighter blocks and reducing the load on the ceiling to which the unit is installed.

(6) Load blocks 3 dust collection blocks 5a and 5b, and fan blocks 7a and 7b each constitute independent blocks. Thus, these blocks can be combined in various ways as separate components, allowing the unit to be implemented for different kinds of sites.

(7) The extension and retraction of retractable loading chute 2 takes place in conjunction with the opening and closing of flap gates 8 and 9, making a dedicated drive mechanism for retractable loading chute 2 unnecessary.

(8) During loose loading, dust protection vinyl sheets 11, attached to flap gates 8 and 9, shield the upper perimeter edges of the truck, preventing powder from leaking outside. An insect elimination sheet may be added to dust protection vinyl sheet 11 to prevent insects from the outside from entering single loader 1 and container 34a.

(9) Driven flap gates 9 are used to move retractable loading chute 2 up and down. Since flap gates 8 are in a free state, they can also serve as an inspection door that can be opened or closed at any time without requiring moving of driven flap gates 9.

(10) An eccentric sprocket is used for the gear box shaft that opens and closes driven flap gates 9, providing for a difference in timing at which the left and right flap gates are opened and closed. As a result, dust protection vinyl sheets 11, attached to the lower end of the flap gates 9, are folded up before the driven flap gates 9 are completely closed.

(11) The air from suction motor fans 6a and 6b forms an air curtain relative to the ground via air curtain nozzle 14. The air curtain blocks natural air currents from the front and prevents the powder from flying up during loading. Also, by having air duct 18 disposed on the outer perimeter surface, air curtain nozzle 14 can be oriented toward the side surface when necessary in order to provide a lateral air current.

(12) By having grating 32 disposed at the lowermost section of retractable loading chute 2, foreign matter mixed into the powder is removed from the product stream. By having funnel-shaped cushion 31 disposed near the upper surface of grating 32, the speed at which material is ejected is lowered to decrease breakage.

(13) By forming left and right flap gates 8 and 9 of varying sizes and attaching an auxiliary hood such as a side curtain hood (not shown in the drawings), the present invention can be used for dump trucks 34 where the entire upper surface is open.

(14) By controlling the backwash operations in dust collection blocks 5a and 5b using truck sensors 13a, 13b, and 13c, dust collection blocks 5b automatically stop backwash operations when they are moved away from container 34a of dump truck 34, preventing the powder from dropping down to the ground and flying out.

(15) By having dust collection blocks 5a and 5b disposed inside single loader 1, powder residue at the internal corners of the housing are eliminated. This construction also allows the housing to be assembled in blocks. As a result, projections such as flanges are not needed on the outer surface of the housing. This provides an outer surface shape that is easier to clean.

(16) By using aluminum plates in the housing, surface processing can be used to prevent corrosion and impurities, such as paint chips, from becoming mixed into the powder.

(17) By adjusting the vertical positioning of the entire single loader 1, the present invention can be used with trucks having different heights.

In the first embodiment of the present invention, the loose powder is loaded into dump truck 34. The following is a description of a second embodiment where loose powder is loaded into a large-capacity semi-trailer dump truck 134 at a loading section 136.

Figure 20:
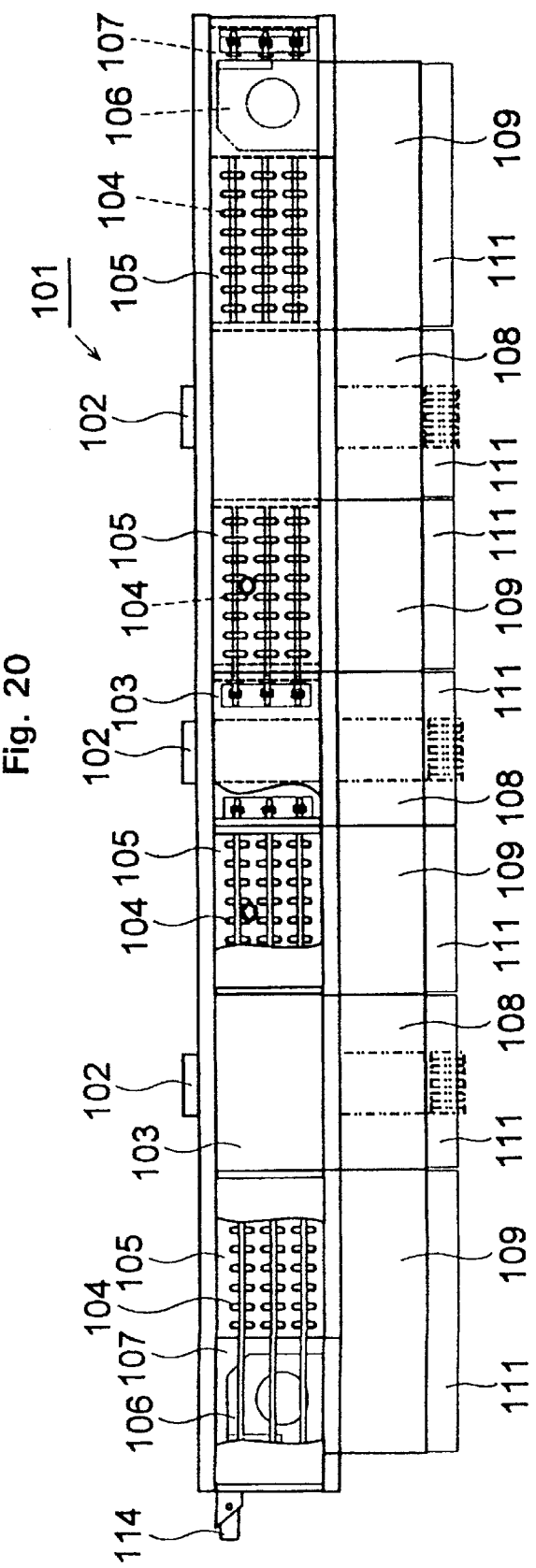
FIG. 20 is a partially cut-away front-view drawing showing the internal structure and exterior of a triple loader for semi-trailer dump trucks according to a second embodiment of the powder loading device of the present invention.
Figure 21:
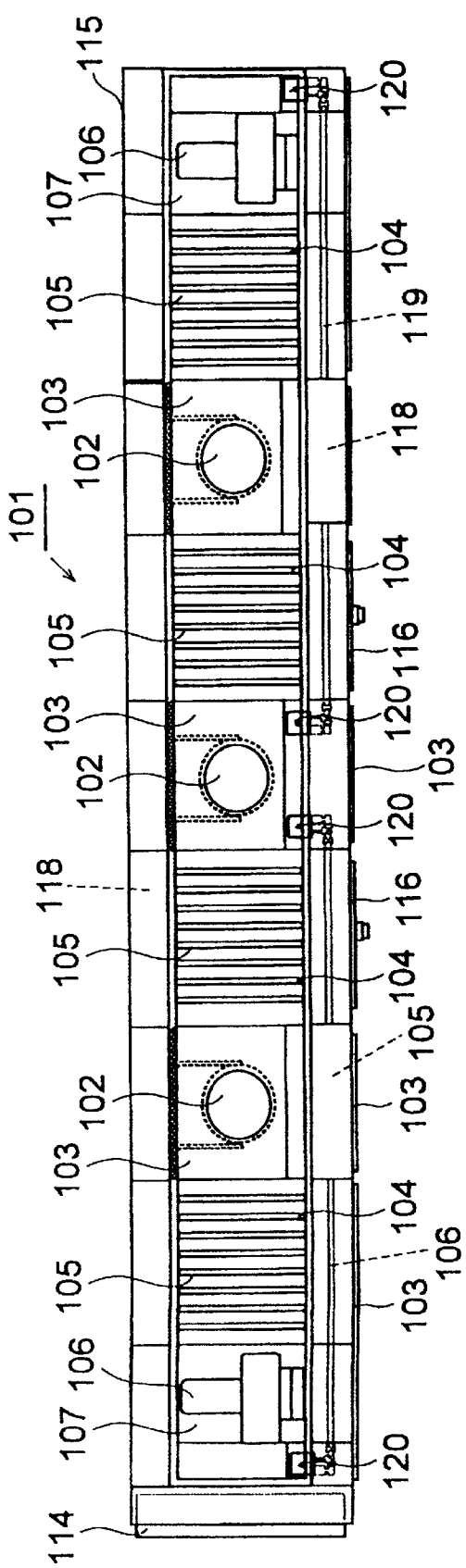
FIG. 21 is a plan drawing of the triple loader of FIG. 20 with its upper surface panel removed so that the inside is visible.

Referring to FIG. 20 and FIG. 21, a triple loader 101 for semi-trailer dump trucks includes loading blocks 103, dust collection blocks 105, and fan blocks 107 arranged in a row. Each of the blocks is formed in a housing of a light metal, such as aluminum. Loading blocks 103 include a retractable loading chute 102 for loading the loose powder into the semi-trailer dump truck. Dust collection blocks 105 are formed from a plurality of laterally arranged dust collection filters 104. Fan blocks 107 contain suction motor fans 106 for dust collection. Triple loader 101 includes a total of seven blocks. Loading blocks 103 and dust collection blocks 105 are arranged in alternation, with fan blocks 107 disposed on the outer ends. Free flap gates 108 open and close the opening on the lower surface of loading blocks 103. Driven flap gates 109 are disposed at the lower portions of dust collection blocks 105. Driven flap gates 109 use a motor to open and close the opening at the lower surface of dust collection blocks 105. Dust protection vinyl sheets 111 are attached to the lower ends of flap gates 108 and 109. An air curtain nozzle 114 is rotatably attached at the left side surface to discharge the air that is taken in through suction motor fans 106 to the exterior of triple loader 101.

An attachment angle 115 attaches the main unit to loading section 136 of the plant. Inspection doors 116, capable of being opened and closed, are disposed on either side of dust collection block 105. Differential pressure gauges 117, for detecting pressure differences between the atmospheric pressure and the pressure inside dust collection chamber 90, are disposed on inspection doors 116. As dust collection filters 4a and 4b become clogged with collected dust, the air flow under loader 1 decreases. Thus, difference in pressure sensed by differential pressure gauges 117 also decreases. At a predetermined value of differential pressure, control unit 39 initiates a backwash operation. An air duct 118 guides suctioned air from dust collection block 105 to air curtain nozzle 114 via fan block 107. An electromagnetic air valve 120 sends high-pressure air to a backwash air jet nozzle pipe 119. A detailed description of these structures is presented in the description of the first embodiment.

One skilled in the art will recognize that differential pressure gauges 117 may be located at different points in the air path, without departing from the spirit and scope of the invention. For example, differential pressure gauges 117 could be relocated on opposite sides of dust collection filters 4a and 4b. In this case, the threshold for initiating the backwash operation would be an increase in differential pressure exceeding a predetermined amount.

Figure 22:
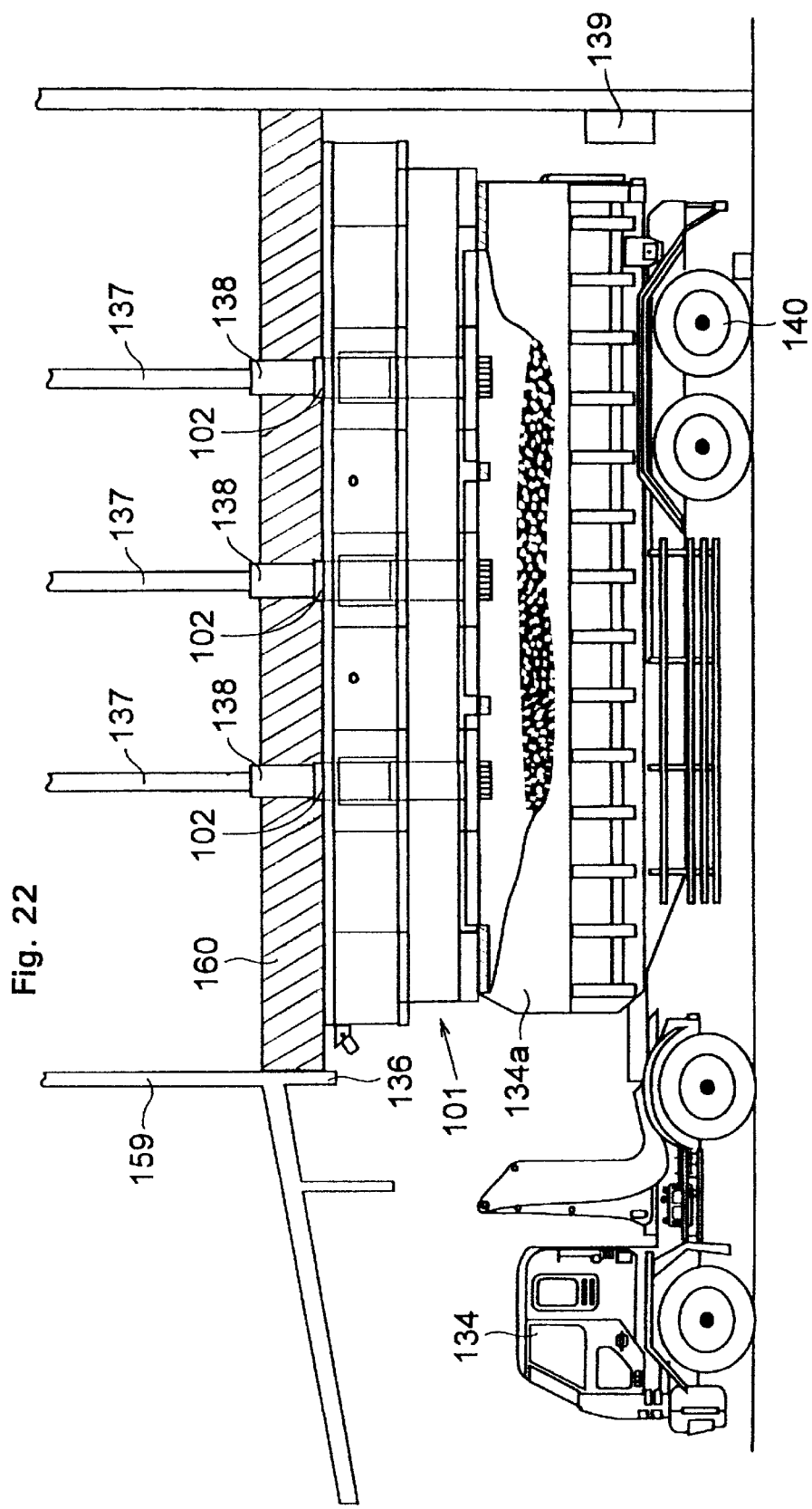
FIG. 22 is an installation diagram showing the triple loader of FIG. 20 installed in a loose loading section on the first floor of a powder/feed plant.

Referring to FIG. 22, the following is a description of how the triple loader for semi-trailer dump trucks according to the second embodiment is installed in first-floor loading section 136 at a powder/feed plant. In a standard large-scale plant that uses semi-trailer dump truck 134 for shipping, the first floor of a plant building 159 serves as loading section 136. Triple loader 101 is directly attached to a ceiling section of a slab 160 in loading section 136. Three powder feeding pipelines 137, laid in the plant, are connected via connecting pipes 138 to retractable loading chutes 102 disposed at three positions. Finally, a control unit 139 is connected to a power supply and attached to a wall in the plant. A truck stopper 140 is placed on the ground. The operations and advantages of the second embodiment are provided in the description of the first embodiment.

The following is a description of a single loader 201 according to a third embodiment where loading of loose material is performed for a semi-trailer dump truck 234 in a powder/feed plant having low ceilings.

Figure 23:
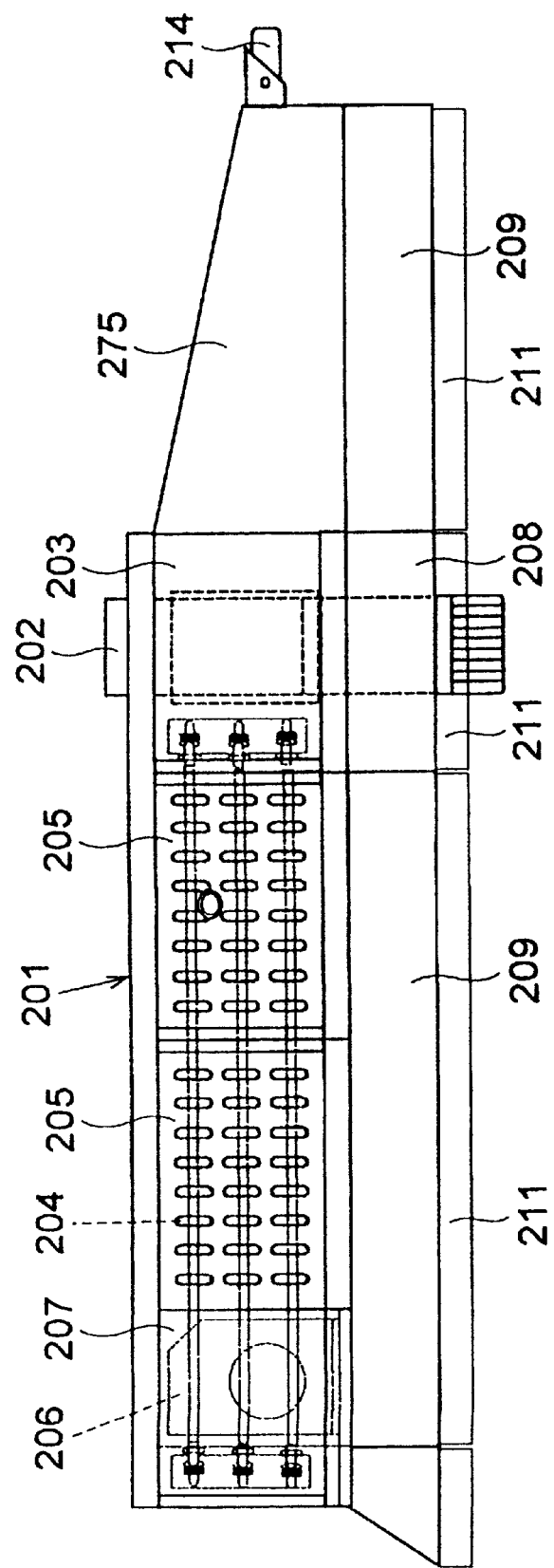
FIG. 23 is a front-view drawing showing the internal structure and exterior of a single loader for semi-trailer dump trucks according to a third embodiment of the powder loading device of the present invention.
Figure 24:
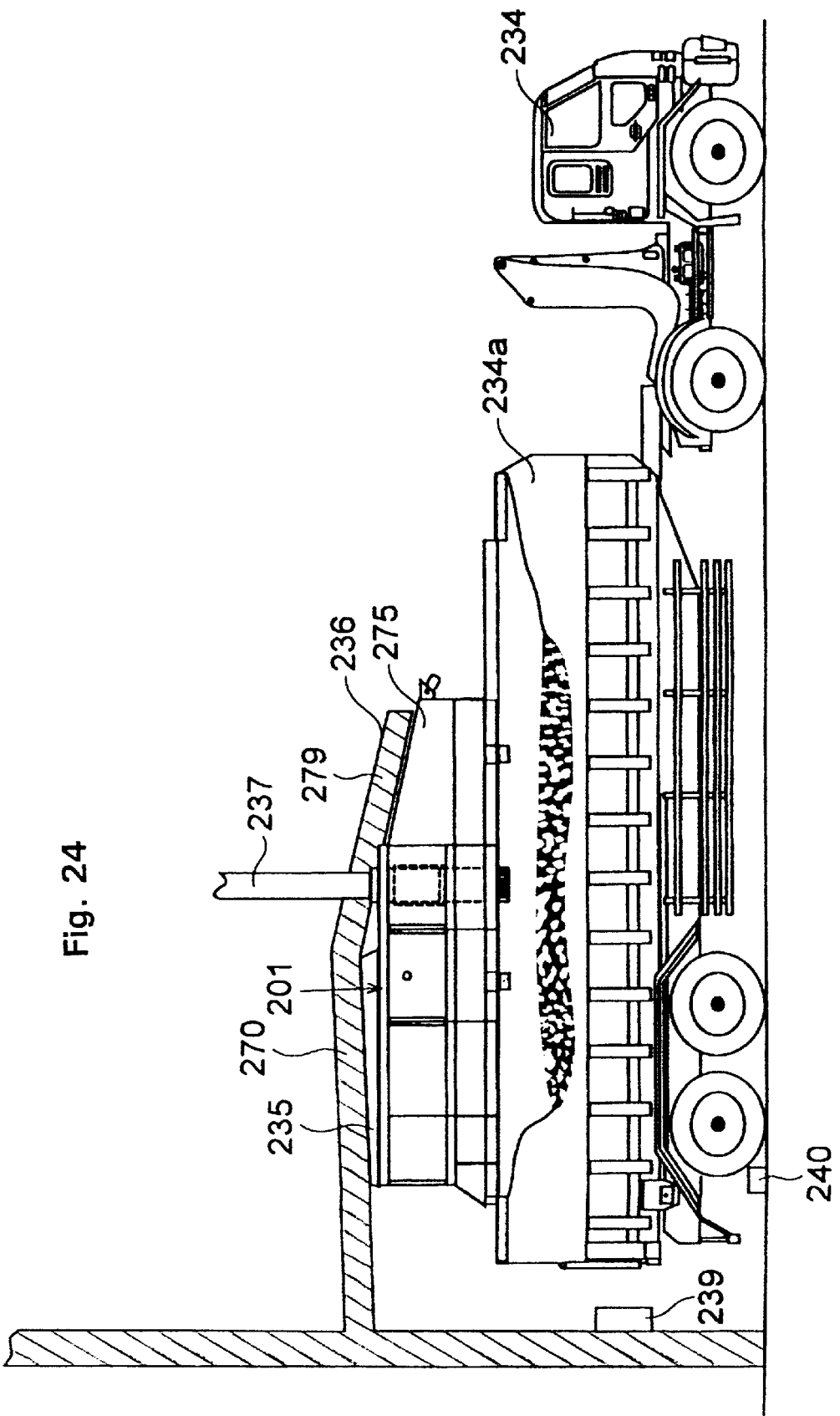
FIG. 24 is an installation diagram showing the single loader of FIG. 23 installed in a loose loading section at the first floor of a powder/feed plant.

Referring to FIG. 23 and FIG. 24, the plant provides an extremely small clearance between the top of a container 234a of semi-trailer dump truck 234 and the ceiling of a loading section 236. Single loader 201 is formed by connecting, from the left, a suction motor fan 206, two dust collection blocks 205, and a loading block 203. Loading block 203 includes a retractable loading chute 202 to load loose powder into semi-trailer dump truck 234. A dust collection block 205 is formed from a plurality of laterally arranged dust collection filters 204. A fan block 207, containing suction motor fan 206, provides the necessary suction to collect dust. The lower portion of single loader 201 includes free flap gates 208, which open and close the lower surface opening of loading block 203, and motor driven flap gates 209, which open and close the lower surface opening of dust collection block 205. Dust protection vinyl sheets 211 attach to the lower ends of the flap gates 208 and 209. Air curtain nozzle 214, rotatably attached to the right side surface of single loader 201, takes the air sucked in by suction motor fan 206 and discharges it outside of single loader 201. A sloped section 275 allows single loader 201 to be attached to the ceiling of loading section 236.

The following is a description of how single loader 201, for semi-trailer dump trucks according to the third embodiment, is installed in loose loading section 236 on the first floor of a powder/feed plant. If the ceiling of loading section 236 is low and eaves 279 at the end of a slab 270 hang down, sloped section 275 of single loader 201 is directly attached to the inside of eaves 270 of loading section 236. An attachment angle 235 fixes single loader 201 to slab 270. Powder feeding pipelines 237 are attached to retractable loading chutes 202. Finally, a control unit 239 is connected to a power supply and attached to a wall in the plant. A truck stopper 240 for semi-trailer dump truck 234 is placed on the ground. The operations and advantages of the third embodiment are as described in the first embodiment.

Figure 25:
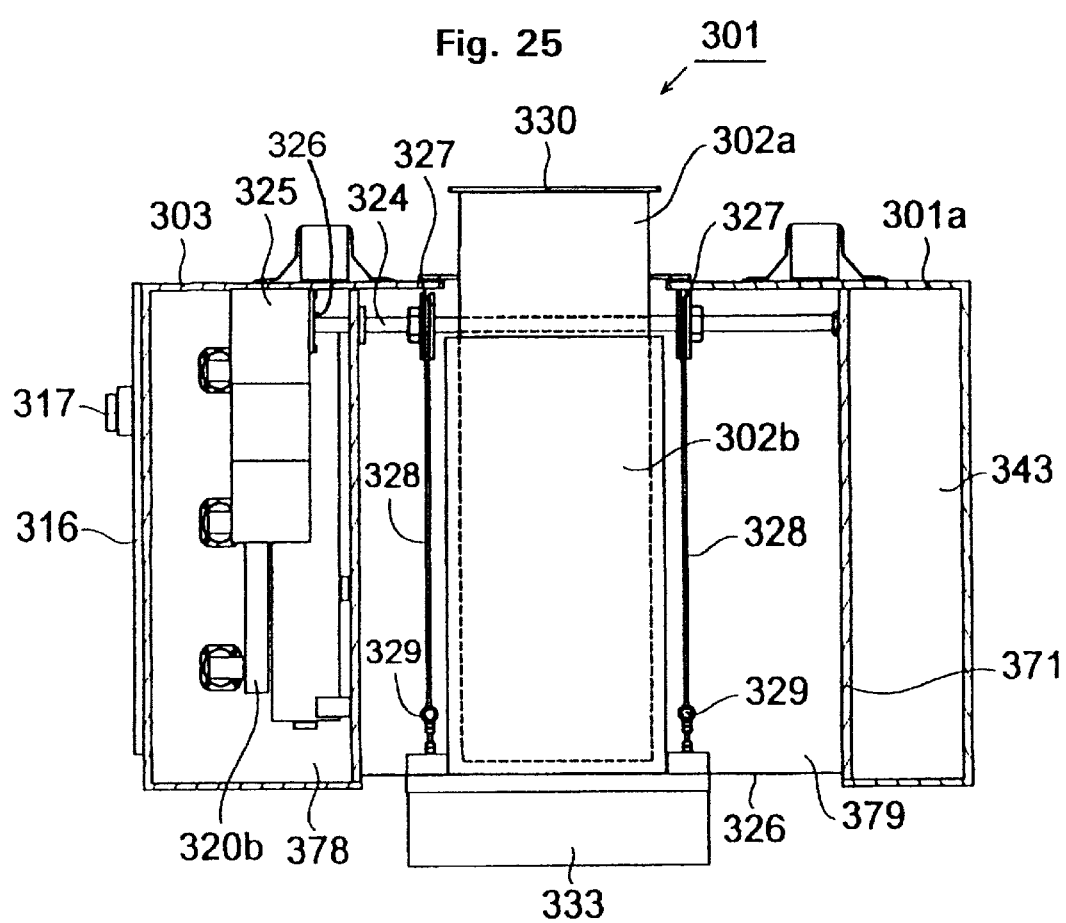
FIG. 25 is a cross-section side-view drawing showing the internal structure of a single loader according to a fourth embodiment of the powder loading device of the present invention.
Figure 26:
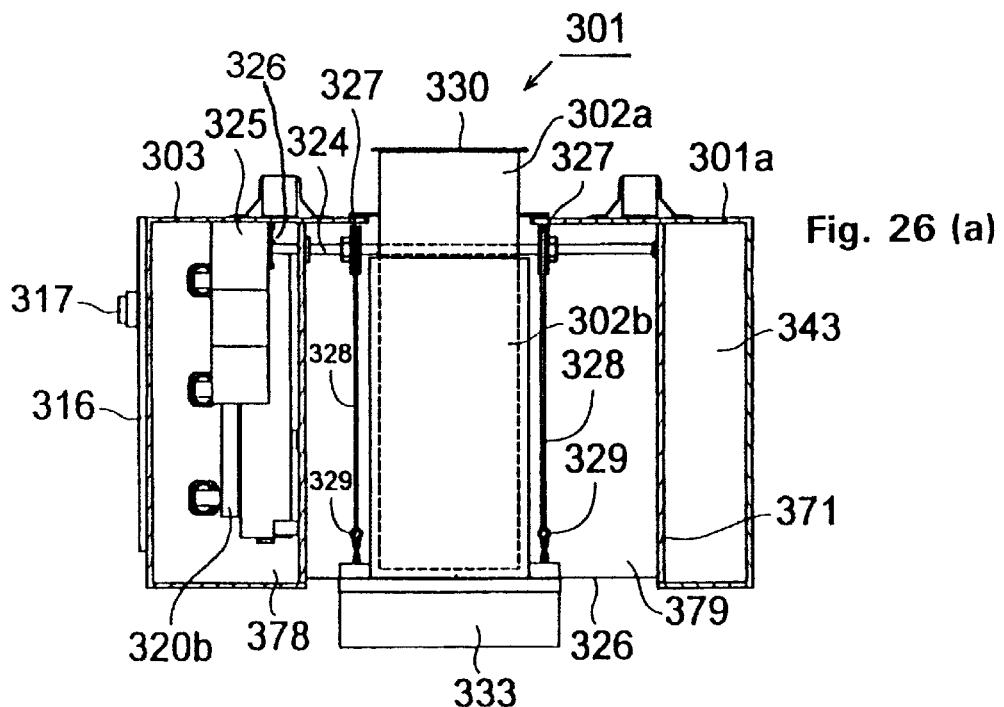
FIG. 26(a) is a drawing for the purpose of describing the retractable loading chute of the single loader of FIG. 25.
FIG. 26(b) is a drawing for the purpose of further describing the retractable loading chute of the single loader of FIG. 25.
Figure 26:
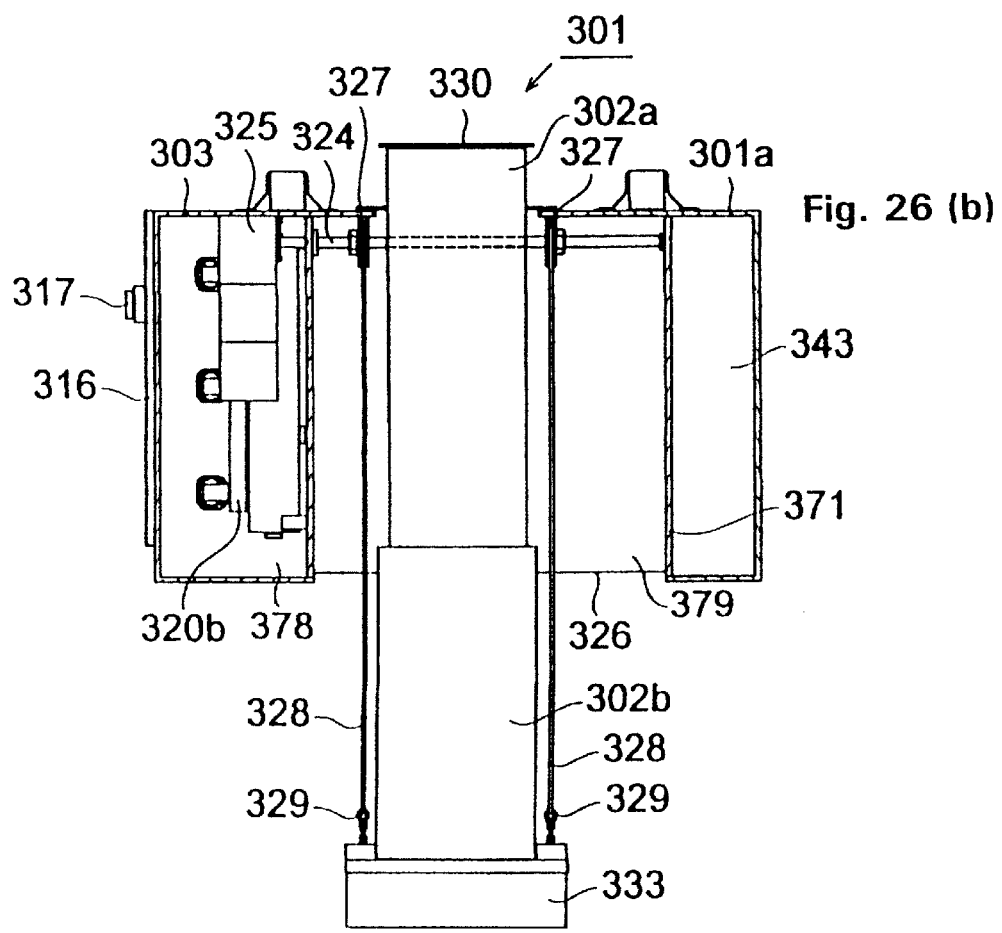

Referring now to FIG. 25, FIG. 26(a) and FIG. 26(b), a single loader 301 is shown according to a fourth embodiment of the present invention. Loading block 3 of the single loader of the first embodiment of the present invention is replaced with a loading block 303 as shown in the drawings. Loading block 303 includes a motor 325 in an upper section inside a holding chamber 378. A shaft 324, connected to motor 325, passes through an inner cylinder 302a. Shaft 324 extends laterally across the upper portion inside loading chamber 379. The ends of shaft 324 are rotatably supported by a bearing 326. A pulley 327 is rotatably attached to shaft 324, and a wire 328 is wrapped around pulley 327. The lower end of wire 328 is fixed to a canvas hood 333 via a hook 329. While funnel-shaped cushion 31, grating 32, and flap gates 8 and 9 are not used in this embodiment, they can be added. Motor 325 rotates forward or reverse based on command signals from control unit 39, causing wire 328 to move an outer cylinder 302b up and down as shown in FIGS. 26(a) and 26(b). The other elements in these figures are shown using numerals in the 300's based on the numerals from the previous embodiments, and the corresponding descriptions are omitted.

The above describes the preferred embodiments of the present invention. However, the present invention is not restricted to the above embodiments and other implementations including improvements, changes, and additions can be used as long as they are within the scope of the technical ideas presented in the present invention. For example, the present invention is capable for use with various types of vehicles such as trucks having a container with the entire upper surface open. This is achieved by attaching an auxiliary hood, such as a side curtain hood, to the outside of flap gates 8 and 9, or by changing the shapes and sizes of the flap gates 8 and 9, i.e., the flap lengths, overall lengths, widths, thicknesses, and the like.

According to the invention, a clean work environment where powder does not fly out is achieved when loading powder into a dump truck, a semi-trailer dump truck, or the like. Variations in pressure used in dust collection are prevented so that efficient dust collection is possible. Pressure loss in the duct piping and contamination inside the duct piping is also prevented. A low-power blower providing low suction power is used in the dust collector. Noise from the dust collector is prevented. Assembly is performed easily and installation time is reduced. The design is easily changed to match the container size of the dump truck, trailer or the like used for loading the loose powder. The unit is installed in loading sections regardless of the shape of the loading section.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A powder loading device for loading powder into a container comprising:
   a housing;
   said housing being positioned to fit above said container;
   at least one loading chute passing generally vertically through said housing for carrying said powder from a source to said container;
   at least one blower in said housing;
   said blower moving air on an air path from below said housing to a location outside said housing;
   at least one filter in said air path; and
   said filter being effective for filtering particles of said powder in said air path.

2. A powder loading device according to claim 1, wherein said at least one loading chute is retractable.

3. A powder loading device according to claim 2, further comprising:

a cover containing flap gates disposed on a lower surface of said housing; and means for opening and closing said flap gates.

4. A powder loading device according to claim 3, wherein said means for opening and closing said flap gates includes an eccentric sprocket mechanism to close a left side flap gate and a right side flap gate at slight different timings.

5. A powder loading device according to claim 3, wherein:

said flap gates are connected to said retractable loading chute via a linking mechanism;

when said flap gates open, said retractable loading chute expands out of said housing; and when said flap gates close, said retractable loading chute retracts into said housing.

6. A powder loading device according to claim 2, further comprising:

an expansion and retraction means to expand and retract said retractable loading chute;

said expansion and retraction means having a motor at an upper section of said housing;

a shaft rotatably connecting said motor to a pulley;

a wire wrapped around said pulley;

a free end of said wire attached to a bottom portion of said retractable loading chute; and when said motor operates in a forward and a reverse direction, said retractable loading chute is expanded and retracted.

7. A powder loading device according to claim 1, wherein said at least one filter is at least one bag filter.

8. A powder loading device according to claim 7, further comprising:

a backwash device;

said backwash device including means for impacting said at least one bag filter for dislodging said powder therefrom;

at least one container sensor for detecting a presence of said container within a predetermined distance below said housing;

a controller receiving a signal indicating said presence; and said controller including means for stopping operation of said backwash device when said signal indicates an absence of said container.

9. A powder loading device according to claim 1, further comprising:

said at least one filter is at least one bag filter;

a backwash device; and means for directing pulsed jets of air on said at least one bag filter.

10. A powder loading device according to claim 1, further comprising:

at least one differential pressure sensor; and said differential pressure sensor sensing a difference in pressure between two points in said air path.

11. A powder loading device according to claim 10, wherein said two points include a first point under said housing and a second point outside said housing.

12. A powder loading device according to claim 1, wherein:

said at least one loading chute includes at least first and second loading chutes spaced apart in said housing; and said at least one filter includes at least first and second filters in said air path.

13. A powder loading device according to claim 1, further comprising:

flap gates disposed on a lower surface of said housing;

means for opening and closing said flap gates.

14. A powder loading device according to claim 13, further comprising:

free flap gates, disposed on a lower surface of said housing, that can be freely opened and closed;

said free flap gates are partially overlapped by said flap gates, whereby said free flap gates are opened and closed by operation of said flap gates.

15. A powder loading device according to claim 14, further comprising:

a detection sensor, disposed on said housing, for detecting said container and generating a detection signal; and said means for opening and closing said flap gates being responsive to said detection signal, opening said flap gates only when said container is present.

16. A powder loading device according to claim 15, wherein said detection sensors are selected from at least one of acoustic, radar, and optical sensors.

17. A powder loading device for loading powder into a container comprising:

a housing;

said housing being positioned to fit above said container;

a loading chute passing generally vertically through said housing for carrying said powder from a source to said container;

at least one blower in said housing;

said blower moving air on an air path from below said housing to a location outside said housing;

a filter in said air path;

said filter being effective for filtering particles of said powder in said air path;

flap gates disposed on a lower surface of said housing;

means for opening and closing said flap gates;

at least one dust protection hood located on at least one longitudinal end of said powder loading device; and said dust protection hood providing a substantially enclosed dust protection chamber between said powder loading device and said container.

* * * * *